United States Patent
Dayan et al.

(10) Patent No.: US 11,603,042 B2
(45) Date of Patent: *Mar. 14, 2023

(54) SYSTEM FOR MONITORING AN AREA ADJACENT A VEHICLE

(71) Applicant: ADC Solutions Auto, LLC, Costa Mesa, CA (US)

(72) Inventors: Mervin A. Dayan, Oakhurst, NJ (US); Maurice S. Dayan, Oakhurst, NJ (US); Larry D. Sharp, Tinton, NJ (US)

(73) Assignee: ADC Solutions Auto, LLC, Costa Mesa, CA (US)

( * ) Notice: Subject to any disclaimer, the term of this patent is extended or adjusted under 35 U.S.C. 154(b) by 588 days.

This patent is subject to a terminal disclaimer.

(21) Appl. No.: 15/894,569

(22) Filed: Feb. 12, 2018

(65) Prior Publication Data
US 2018/0297521 A1 Oct. 18, 2018

Related U.S. Application Data

(63) Continuation of application No. 13/462,371, filed on May 2, 2012, now abandoned, which is a continuation
(Continued)

(51) Int. Cl.
*B60R 1/00* (2022.01)
*B60K 35/00* (2006.01)
(Continued)

(52) U.S. Cl.
CPC .............. *B60R 1/00* (2013.01); *B60K 35/00* (2013.01); *B60K 37/06* (2013.01);
(Continued)

(58) Field of Classification Search
CPC ...... B60K 2370/143; B60K 2370/1438; B60K 35/00; B60K 37/06; B60R 1/00;
(Continued)

(56) References Cited

U.S. PATENT DOCUMENTS

| 3,442,191 A | 5/1969 | Harvey |
|---|---|---|
| 3,868,743 A | 3/1975 | Kakizaki |

(Continued)

FOREIGN PATENT DOCUMENTS

| CN | 200630058455.5 | 2/2007 |
|---|---|---|
| CN | 200630058456.X | 2/2007 |

(Continued)

OTHER PUBLICATIONS

Thomas I. Rozza, "Answer to complaint and counterclaims," *Intellectual Solutions, Inc. v. Shaghai, Ltd*1/1612008. united States District Court for the Central District of Celifomia Western Division Case No. CV07-07903SJO(RCx).

(Continued)

*Primary Examiner* — William C Vaughn, Jr.
*Assistant Examiner* — Naod W Belai
(74) *Attorney, Agent, or Firm* — Lowenstein Sandler LLP

(57) ABSTRACT

A backup camera system for monitoring an area around a vehicle. In one aspect, the system comprises a camera assembly, a display device and a stand for supporting the display device; the camera assembly comprising: (i) a camera adapted to produce an image signal corresponding to a perceived image, (ii) means for supplying power; (iii) a base having first and second holes that are configured and spaced from one another so as to facilitate attachment to the vehicle using the vehicle's license plate mounting bolts, (iv) a transmitter operably coupled to the camera for wirelessly transmitting the image signal; and the display device comprising: (i) a receiver for receiving the wirelessly transmitted image signal, (ii) means for supplying power, (iii) an image processing unit operably coupled to the receiver for converting the received image signal into a display image that is displayed on the display device, the display image cor- (Continued)

responding to the perceived image. The backup camera system can form a retrofit kit.

11 Claims, 31 Drawing Sheets

Related U.S. Application Data of application No. 11/854,815, filed on Sep. 13, 2007, now Pat. No. 8,194,132, which is a continuation-in-part of application No. 11/778,339, filed on Jul. 16, 2007, now abandoned, which is a continuation-in-part of application No. 11/567,504, filed on Dec. 6, 2006, now Pat. No. 7,245,207, which is a continuation of application No. 29/258,863, filed on Apr. 28, 2006, now Pat. No. Des. 536,012, and a continuation-in-part of application No. 29/258,861, filed on Apr. 28, 2006, now Pat. No. Des. 536,016, and a continuation-in-part of application No. 29/252,239, filed on Jan. 20, 2006, now Pat. No. Des. 536,360, and a continuation-in-part of application No. 29/252,238, filed on Jan. 20, 2006, now Pat. No. Des. 535,676.

(60) Provisional application No. 60/949,759, filed on Jul. 13, 2007, provisional application No. 60/889,631, filed on Feb. 13, 2007, provisional application No. 60/882,681, filed on Dec. 29, 2006, provisional application No. 60/826,618, filed on Sep. 22, 2006.

(51) Int. Cl.
  *B60K 37/06* (2006.01)
  *B60R 11/02* (2006.01)
  *B60R 11/04* (2006.01)
  *B60R 11/00* (2006.01)

(52) U.S. Cl.
  CPC .......... *B60R 11/0235* (2013.01); *B60R 11/04* (2013.01); *B60K 2370/143* (2019.05); *B60K 2370/1438* (2019.05); *B60R 2011/0005* (2013.01); *B60R 2300/406* (2013.01); *B60R 2300/602* (2013.01); *B60R 2300/8026* (2013.01); *B60R 2300/8066* (2013.01)

(58) Field of Classification Search
  CPC . B60R 11/0235; B60R 11/04; B60R 11/0005; B60R 2300/406; B60R 2300/23; B60R 2300/8026; B60R 2300/8066
  See application file for complete search history.

(56) References Cited

U.S. PATENT DOCUMENTS

| | | |
|---|---|---|
| 4,113,137 A | 9/1978 | Wind |
| 4,214,266 A | 7/1980 | Myers |
| 4,262,383 A | 4/1981 | Sohn |
| 4,277,804 A | 7/1981 | Robison |
| 4,420,238 A | 12/1983 | Felix |
| 4,504,861 A | 3/1985 | Dougherty |
| 4,517,565 A | 5/1985 | Nakamura et al. |
| 4,532,544 A | 7/1985 | Federau |
| 4,789,904 A | 12/1988 | Peterson |
| 4,895,326 A | 1/1990 | Nimpoeno |
| 4,910,591 A | 3/1990 | Petrossian et al. |
| 4,993,913 A | 2/1991 | Ohtsuki |
| 5,027,200 A | 6/1991 | Petrossian et al. |
| 5,056,902 A | 10/1991 | Chinnock et al. |
| 5,056,903 A | 10/1991 | Nakamura et al. |
| 5,077,567 A | 12/1991 | Haraguchi et al. |
| 5,107,286 A | 4/1992 | Sergeant et al. |
| 5,111,289 A | 5/1992 | Lucas et al. |
| 5,113,290 A | 5/1992 | Fletcher |
| 5,260,731 A | 11/1993 | Baker, Jr. |
| 5,264,962 A | 11/1993 | Kho |
| 5,289,091 A | 2/1994 | Wada |
| 5,289,321 A | 2/1994 | Secor |
| 5,355,818 A | 10/1994 | Strait et al. |
| 5,410,346 A | 4/1995 | Saneyoshi et al. |
| 5,455,625 A | 10/1995 | Englander |
| 5,467,264 A | 11/1995 | Rauch et al. |
| 5,475,494 A | 12/1995 | Nishida et al. |
| 5,529,271 A | 6/1996 | Dunchock |
| 5,550,677 A | 8/1996 | Schofield et al. |
| D373,580 S | 9/1996 | Nakada et al. |
| 5,574,426 A | 11/1996 | Shisgal et al. |
| 5,574,443 A | 11/1996 | Hsieh |
| D376,146 S | 12/1996 | Totsch |
| 5,594,498 A | 1/1997 | Fraley |
| 5,596,228 A | 1/1997 | Anderton et al. |
| D378,095 S | 2/1997 | Hasegawa |
| 5,612,686 A | 3/1997 | Takano et al. |
| 5,642,238 A | 6/1997 | Sala |
| 5,648,835 A | 7/1997 | Uzawa |
| 5,670,935 A | 9/1997 | Schofield et al. |
| 5,677,667 A | 10/1997 | Lesesky et al. |
| 5,680,123 A | 10/1997 | Lee |
| D388,107 S | 12/1997 | Huckins |
| D388,450 S | 12/1997 | Hamano et al. |
| 5,725,189 A | 3/1998 | Landy |
| 5,729,016 A | 3/1998 | Klapper et al. |
| 5,738,322 A | 4/1998 | Huang |
| 5,760,828 A | 6/1998 | Cortes |
| 5,793,300 A | 8/1998 | Suman et al. |
| 5,793,308 A | 8/1998 | Rosinski et al. |
| 5,835,808 A | 11/1998 | Parker et al. |
| 5,848,299 A | 12/1998 | Shepper |
| 5,852,754 A | 12/1998 | Schneider |
| 5,947,440 A | 9/1999 | Cho |
| 5,956,527 A | 9/1999 | Dowe |
| 5,959,555 A | 9/1999 | Furuta |
| 6,025,784 A | 2/2000 | Mish |
| 6,025,872 A | 2/2000 | Ozaki et al. |
| 6,036,070 A | 3/2000 | Gauthier et al. |
| D425,558 S | 5/2000 | Tarpenning et al. |
| 6,078,355 A | 6/2000 | Zengel |
| 6,091,453 A | 7/2000 | Coan et al. |
| 6,100,921 A | 8/2000 | Rowley |
| 6,111,498 A | 8/2000 | Jobes et al. |
| 6,122,597 A | 9/2000 | Saneyoshi et al. |
| 6,126,125 A | 10/2000 | Dalton |
| 6,130,706 A | 10/2000 | Hart, Jr. et al. |
| 6,147,701 A | 11/2000 | Tamura et al. |
| 6,151,065 A | 11/2000 | Steed et al. |
| 6,151,539 A | 11/2000 | Bergholz et al. |
| 6,163,755 A | 12/2000 | Peer et al. |
| 6,175,300 B1 | 1/2001 | Kendrick |
| 6,222,447 B1 | 4/2001 | Schofield et al. |
| 6,259,359 B1 | 7/2001 | Fujinami et al. |
| 6,259,475 B1 | 7/2001 | Ramachandran et al. |
| 6,281,808 B1 | 8/2001 | Glier et al. |
| 6,311,123 B1 | 10/2001 | Nakamura et al. |
| D451,097 S | 11/2001 | Schmeisser et al. |
| 6,320,612 B1 | 11/2001 | Young |
| D451,505 S | 12/2001 | Iseki et al. |
| 6,327,536 B1 | 12/2001 | Tsuji et al. |
| D454,146 S | 3/2002 | Mori |
| D454,902 S | 3/2002 | Hsu et al. |
| 6,360,170 B1 | 3/2002 | Ishikawa et al. |
| 6,375,368 B1 | 4/2002 | Salvato et al. |
| 6,389,339 B1 | 5/2002 | Just |
| 6,433,680 B1 * | 8/2002 | Ho .......................... B60Q 1/22 |
| | | 180/169 |
| 6,441,872 B1 | 8/2002 | Ho |
| D463,432 S | 9/2002 | Bruckner |
| 6,509,832 B1 | 1/2003 | Bauer et al. |
| D470,140 S | 2/2003 | Lin |
| 6,515,581 B1 | 2/2003 | Ho |
| 6,525,762 B1 | 2/2003 | Mileski et al. |
| 6,538,827 B2 | 3/2003 | Bos |
| 6,542,085 B1 | 4/2003 | Yang |

(56) References Cited

U.S. PATENT DOCUMENTS

| | | |
|---|---|---|
| 6,542,182 B1 | 4/2003 | Chutorash |
| D474,737 S | 5/2003 | Yoshida |
| 6,611,744 B1 | 8/2003 | Shimazaki et al. |
| 6,618,672 B2 | 9/2003 | Sasaki et al. |
| 6,621,421 B2 | 9/2003 | Kuriya et al. |
| D481,057 S | 10/2003 | Brady |
| 6,630,888 B2 | 10/2003 | Lang et al. |
| 6,642,840 B2 | 11/2003 | Lang et al. |
| D483,361 S | 12/2003 | Yao et al. |
| D484,131 S | 12/2003 | Olson et al. |
| D484,161 S | 12/2003 | Mendoza |
| 6,665,614 B2 | 12/2003 | Sekiguchi |
| D485,234 S | 1/2004 | Katayama |
| 6,675,075 B1 | 1/2004 | Engelsberg et al. |
| 6,675,934 B1 | 1/2004 | McCormick |
| D487,104 S | 2/2004 | Obata |
| 6,690,268 B2 | 2/2004 | Schofield et al. |
| 6,690,413 B1 | 2/2004 | Moore |
| 6,693,518 B2 | 2/2004 | Kumata et al. |
| 6,693,519 B2 | 2/2004 | Keirstead |
| 6,696,943 B1 | 2/2004 | Elrod et al. |
| D487,762 S | 3/2004 | Kapenekas et al. |
| 6,704,653 B2 | 3/2004 | Kuriya et al. |
| 6,717,610 B1 | 4/2004 | Bos et al. |
| 6,721,501 B2 | 4/2004 | Komatsu |
| D490,028 S | 5/2004 | Orsini |
| 6,744,380 B2 | 6/2004 | Imanishi et al. |
| D494,970 S | 8/2004 | Chen |
| 6,785,404 B1 | 8/2004 | Shimazaki et al. |
| D496,312 S | 9/2004 | Sybilrud et al. |
| 6,795,110 B1 | 9/2004 | Kossin |
| 6,819,231 B2 | 11/2004 | Berberich et al. |
| 6,824,318 B2 | 11/2004 | Toste et al. |
| 6,825,880 B2 | 11/2004 | Asahi et al. |
| 6,828,903 B2 | 12/2004 | Watanabe et al. |
| 6,843,689 B2 | 1/2005 | Coniff |
| 6,850,827 B1 | 2/2005 | Morris |
| 6,859,730 B2 | 2/2005 | Sekiguchi |
| D503,183 S | 3/2005 | Arbuckle et al. |
| D504,890 S | 5/2005 | Sung et al. |
| D506,195 S | 6/2005 | Leveridge et al. |
| D506,215 S | 6/2005 | Lin et al. |
| 6,919,822 B2 | 7/2005 | Tanaka et al. |
| 6,919,917 B1 | 7/2005 | Janssen |
| D508,034 S | 8/2005 | Liao |
| D508,710 S | 8/2005 | Nagai |
| D508,934 S | 8/2005 | Nagai |
| 6,925,370 B2 | 8/2005 | Smith et al. |
| 6,932,760 B1 | 8/2005 | Pang et al. |
| 6,950,014 B2 | 9/2005 | Rao et al. |
| 6,950,035 B2 | 9/2005 | Tanaka et al. |
| D510,576 S | 10/2005 | Summit et al. |
| D510,919 S | 10/2005 | Kubota et al. |
| 6,961,661 B2 | 11/2005 | Sekiguchi |
| 6,982,740 B2 | 1/2006 | Mair et al. |
| 6,985,171 B1 | 1/2006 | Kuriya et al. |
| 6,989,736 B2 | 1/2006 | Berberich et al. |
| D514,558 S | 2/2006 | Nagel et al. |
| D515,562 S | 2/2006 | Rodarte et al. |
| 7,001,028 B2 | 2/2006 | Koshimura |
| 7,002,621 B2 | 2/2006 | Mair et al. |
| 7,005,974 B2 | 2/2006 | McMahon et al. |
| 7,006,127 B2 | 2/2006 | Mizusawa et al. |
| 7,008,069 B2 | 3/2006 | Ostreko et al. |
| 7,012,548 B2 | 3/2006 | Ishii et al. |
| 7,012,549 B2 | 3/2006 | Mizusawa et al. |
| 7,024,286 B2 | 4/2006 | Kimura et al. |
| 7,030,775 B2 | 4/2006 | Sekiguchi |
| 7,030,778 B2 | 4/2006 | Ra |
| 7,038,577 B2 | 5/2006 | Pawlicki et al. |
| 7,049,945 B2 | 5/2006 | Breed et al. |
| 7,050,089 B2 | 5/2006 | Nakamura |
| 7,053,794 B2 | 5/2006 | Tanaka et al. |
| D522,473 S | 6/2006 | Lin |
| 7,057,505 B2 | 6/2006 | Iwamoto |
| 7,057,639 B2 | 6/2006 | Spoonhower et al. |
| 7,068,289 B2 | 6/2006 | Satoh et al. |
| 7,069,128 B2 | 6/2006 | Iwama |
| 7,088,262 B2 | 8/2006 | Schindler et al. |
| 7,095,569 B2 | 8/2006 | Rege et al. |
| 7,106,183 B2 | 9/2006 | Hong |
| 7,110,021 B2 | 9/2006 | Nobori et al. |
| 7,133,661 B2 | 11/2006 | Hatae et al. |
| 7,184,074 B1 | 2/2007 | Jansen |
| 7,195,267 B1 | 3/2007 | Thompson |
| 7,195,405 B2 | 3/2007 | Son |
| D543,225 S | 5/2007 | Shimizu |
| 7,245,207 B1 | 7/2007 | Dayan et al. |
| 2001/0022616 A1 | 9/2001 | Rademacher et al. |
| 2002/0000357 A1 | 1/2002 | Henderson |
| 2002/0003571 A1 | 1/2002 | Schofield et al. |
| 2002/0057915 A1 | 5/2002 | Mann |
| 2002/0101041 A1 | 8/2002 | Kameyama |
| 2002/0105413 A1 | 8/2002 | Cern et al. |
| 2002/0118282 A1 | 8/2002 | Nakamura |
| 2002/0126206 A1 | 9/2002 | Hunte |
| 2002/0126457 A1 | 9/2002 | Kameyama |
| 2002/0128750 A1* | 9/2002 | Kakinami ............... B60Q 9/005 701/1 |
| 2002/0140848 A1 | 10/2002 | Cooper et al. |
| 2002/0149673 A1 | 10/2002 | Hirama et al. |
| 2003/0020603 A1* | 1/2003 | DeLine ................... B60R 1/12 340/425.5 |
| 2003/0041329 A1 | 2/2003 | Bassett |
| 2003/0080877 A1 | 5/2003 | Takagi et al. |
| 2003/0081123 A1 | 5/2003 | Rupe |
| 2003/0090787 A1 | 5/2003 | Dottle |
| 2003/0133014 A1 | 7/2003 | Mendoza |
| 2003/0156193 A1 | 8/2003 | Nakamura |
| 2003/0175027 A1 | 9/2003 | Komatsu |
| 2004/0032321 A1* | 2/2004 | McMahon ............. B60Q 9/005 340/425.5 |
| 2004/0036768 A1 | 2/2004 | Green |
| 2004/0085450 A1 | 5/2004 | Stuart |
| 2004/0143373 A1 | 7/2004 | Ennis |
| 2004/0145457 A1 | 7/2004 | Schofield et al. |
| 2004/0160786 A1 | 8/2004 | Bauer et al. |
| 2004/0203345 A1 | 10/2004 | Tehrani |
| 2004/0207260 A1 | 10/2004 | Hattori et al. |
| 2004/0218042 A1 | 11/2004 | Kanada et al. |
| 2004/0263623 A1 | 12/2004 | Arbuckle |
| 2005/0005484 A1 | 1/2005 | Simonazzi |
| 2005/0046696 A1 | 3/2005 | Lang et al. |
| 2005/0075770 A1 | 4/2005 | Taylor et al. |
| 2005/0088281 A1 | 4/2005 | Rohrberg et al. |
| 2005/0093684 A1 | 5/2005 | Cunnien |
| 2005/0143911 A1 | 6/2005 | Ishibashi et al. |
| 2005/0146607 A1 | 7/2005 | Linn et al. |
| 2005/0156753 A1 | 7/2005 | DeLine et al. |
| 2005/0174429 A1 | 8/2005 | Yanai |
| 2005/0192725 A1 | 9/2005 | Li |
| 2005/0195282 A1 | 9/2005 | Wei |
| 2005/0198876 A1 | 9/2005 | Chang et al. |
| 2005/0203704 A1 | 9/2005 | Frank et al. |
| 2005/0206780 A1 | 9/2005 | Iwasaki et al. |
| 2006/0050149 A1 | 3/2006 | Lang et al. |
| 2006/0061655 A1 | 3/2006 | Wang |
| 2006/0069478 A1* | 3/2006 | Iwama ............... B62D 15/0245 701/36 |
| 2006/0070109 A1 | 3/2006 | Renkis |
| 2006/0072011 A1 | 4/2006 | Okada |
| 2006/0072917 A1 | 4/2006 | Miyazaki et al. |
| 2006/0098094 A1* | 5/2006 | Lott ........................ B60R 1/00 348/148 |
| 2006/0112409 A1 | 5/2006 | Yoon |
| 2006/0125919 A1 | 6/2006 | Camilleri et al. |
| 2006/0140448 A1 | 6/2006 | Fujii et al. |
| 2006/0145826 A1 | 7/2006 | McMahon et al. |
| 2006/0164220 A1 | 7/2006 | Harter et al. |
| 2006/0171704 A1 | 8/2006 | Bingle et al. |
| 2006/0209187 A1 | 9/2006 | Farneman |
| 2006/0221183 A1 | 10/2006 | Sham |
| 2006/0232670 A1 | 10/2006 | Chu |
| 2007/0057781 A1 | 3/2007 | Breed |

(56) References Cited

U.S. PATENT DOCUMENTS

| | | | |
|---|---|---|---|
| 2007/0182817 | A1 | 8/2007 | Briggance |
| 2007/0236364 | A1 | 10/2007 | Hubbard et al. |
| 2007/0236569 | A1 | 10/2007 | Lin |

FOREIGN PATENT DOCUMENTS

| | | |
|---|---|---|
| CN | 200630058754.9 | 2/2007 |
| DE | 19841915 A1 | 3/2000 |
| EP | 830985 A1 | 3/1998 |
| EP | 1087620 A2 | 3/2001 |
| EP | 1308346 A2 | 5/2003 |
| EP | 1529688 A1 | 5/2005 |
| FR | 2859425 A1 | 3/2005 |
| GB | 2327823 A | 2/1999 |
| GB | 2341028 A | 3/2000 |
| GB | 2415568 A | 12/2005 |
| JP | 5000638 | 1/1993 |
| JP | 5050880 | 1/1993 |
| JP | 8080790 | 3/1996 |
| JP | 9202181 | 8/1997 |
| JP | 10044891 | 2/1998 |
| JP | 10109590 | 8/1998 |
| JP | 10203259 | 8/1998 |
| JP | 10271489 | 10/1998 |
| JP | 2000134516 A | 5/2000 |
| JP | 2000175182 A | 6/2000 |
| JP | 2002221748 A | 8/2002 |
| JP | 2002245973 A | 8/2002 |
| JP | 2003002115 A | 1/2003 |
| JP | 2003154897 A | 5/2003 |
| JP | 2003291725 A | 10/2003 |
| JP | 2004098816 A | 4/2004 |
| JP | 2004203345 A | 7/2004 |
| JP | 2004216976 A | 8/2004 |
| JP | 2004254219 A | 9/2004 |
| JP | 2004322799 A | 11/2004 |
| JP | 2004349857 A | 12/2004 |
| JP | 2005119409 A | 5/2005 |
| KR | 333908 | 4/2002 |

OTHER PUBLICATIONS

John K. Park, Chong H. Roh, First Amended Complaint for Patent Infringement, *Vision Tech America, Inc.*, v *Serv Corp*, Jan. 15, 2008, United States District Court Central District of California, Case No. 07-05120-ABC-JC.

Hara K. Jacobs, 'Answer, Affirmative Defenses and Counterclaims of Defendant Winplus North America, Inc. to Plaintiffs' Complaint.' *Intellectual Solutions, Inc.* v *Winplus North America, Inc.*, 11/3012007, United States District 0 Court for the District of New Jersey, Case No. 1 :07-CV-05523-JEI-JS.

Hara K. Jacobs, 'First Amended Answer, Affirmative Defenses and Counterclaims of Defendant Winplus North America, Inc. to Plaintiffs' Complaint,' *Intellectual Solutions, Inc.* v. *Winplus North America, Inc.*, Jan. 18, 2008, United 0 States District Court for the District of New Jersey, Case No. 1:07-CV-05523-JEI-JS.

Miwa Moritaka A1kyo Hideyuki Hayashi Takeshi, ~UE Kenichi Uozumi Shigeyasu, Development of an in-vehicle used camera. Alsln Seiki Co., Ltd., JPN: Toyota Motor Corp., JPN 2006. Jidosha Gijutsukai Gakujutsu 0 Koenkai Maezunshu, 75:06, p. 5-7.

Takeshima Masahiro, Matsuura Yuzuru K1tazawa Shohei, Takahashi Tomokazu: a Study of a Driver's maneuverability while Reversing-In the case of a Vehide's behavior while Backing up as Monitored by a Driver. Osaka Inc. Univ., Grad SOO, Osaxa Ind Univ., Nlssonabisu, 2003, Jidosha GiJutsukai Gakujutau Koenkai 0 Maezunshu, 92:03, p. 15-18.

Randy Frank, Vision Sensing Enables Safer Vehicles, Auto Electronics, Jan./Feb. 2006.

"Camera-based side-view mirror for Improved lateral Visibility in motor vehicles," IBM. Mar. 8, 2006.

Office Action dated Apr. 2, 2007 for U.S. Appl. No. 11/567,504, filed 1210612006.

Pre-Examination Search Document submitted to the USPTO dated 1210612006.

Accelerated Examination Support Document submitted to the USPTO dated Dec. 6, 2006.

Supplemental Examination Search Document submitted to the USPTO dated Apr. 27, 2007.

Supplemental Accelerated Examination Support Document in Response to the Office Action submitted to the USPTO dated Apr. 27, 2007.

\* cited by examiner

SYSTEM FOR MONITORING AN AREA ADJACENT A VEHICLE

CROSS-REFERENCE TO RELATED PATENT APPLICATIONS

The present application is a continuation of U.S. patent application Ser. No. 13/462,371 filed May 2, 2012, now abandoned, which is a continuation of U.S. patent application Ser. No. 11/854,815 filed Sep. 13, 2007, now U.S. Pat. No. 8,194,132, which claims the benefit of U.S. Provisional Application 60/949,759, filed. Jul. 13, 2007, U.S. Provisional Application 60/889,631, filed Feb. 13, 2007. U.S. Provisional Patent Application 60/882,681, filed Dec. 29, 2006 and U.S. Provisional Patent Application 60/826,618, filed Sep. 22, 2006, the entireties of which are hereby incorporated by reference. U.S. patent application Ser. No. 11/854,815 is also a continuation-in-part of U.S. Non-Provisional patent application Ser. No. 11/778,339, filed Jul. 16, 2007 now abandoned, which is a continuation in part of U.S. Non-Provisional application Ser. No. 11/567,504, filed Dec. 6, 2006, now U.S. Pat. No. 7,245,207, which claims the benefit of U.S. Provisional Patent Application 60/889,631, filed. Feb. 13, 2007. U.S. patent application Ser. No. 11/567,504 is also a continuation-in-part of U.S. Design patent application Ser. No. 29/252,238, filed Jan. 20, 2006, now U.S. Design Pat. No. D535,676, U.S. Design patent application Ser. No. 29/252,239, filed Jan. 20, 2006, now U.S. Design Pat. No. D536,360, U.S. Design patent application Ser. No. 29/252,296, filed Jan. 20, 2006, now U.S. Design Pat. No. D536,011, U.S. Design patent application Ser. No. 29/258,861, filed Apr. 28, 2006, now U.S. Design Pat. No. D536,016, and U.S. Design patent application Ser. No. 29/258,863, filed Apr. 28, 2006, now U.S. Design Pat. No. D536,012, the entireties of which are hereby incorporated by reference.

FIELD OF THE INVENTION

The present invention relates generally to safety systems in vehicles, and specifically to systems and methods for facilitating improved monitoring of an area adjacent a vehicle from within the passenger compartment of the vehicle.

BACKGROUND OF THE INVENTION

When operating a vehicle, it is often difficult to adequately view the areas adjacent the vehicle, especially the area behind the vehicle. This is especially problematic for the operators of larger vehicles such as pick-up trucks, sport utility vehicles ("SUVs"), tractor trailers and other large and/or raised vehicles. The dangers associated with inadequate visibility have become exasperated as the popularity of SUVs has resulted in the widespread operation of larger and raised vehicles by people who are ordinarily not accustomed to operating such vehicles.

In the past, people have attempted to ameliorate the lack of visibility by placing mirrors at various locations throughout the car. Mirrors have generally proven to be a reliable method of viewing an area behind the vehicle while in reverse. However, mirrors typically do not provide the vehicle operator with an unobstructed view of the area directly behind the vehicle.

Recently, cameras and sensors have become popular in order to detect the presence of objects (including people) behind the vehicle. While existing cameras and sensors have prevented many unfortunate events, problems still persist and accidents are still occurring. Moreover, the existence of such sensors and cameras is generally limited to factory installed systems that are typically only present on high-end vehicles. Thus, older and/or less expensive vehicles tend to not have such sensors and/or cameras.

While some cameras do exist for mounting onto a vehicle, these cameras suffer from a wide variety of deficiencies, including complexity of mounting and less than optimal performance. When mounting a camera on a vehicle, the placement and orientation of the camera are important. Improper mounting may result in the operator not being able to adequately view an object behind the vehicle until it is too late. Many cameras are unable to provide a proper viewing angle for the vehicle upon which it is mounted.

Additionally, cameras that are mounted on vehicles are exposed to the effects of the environment, such as changes in temperature, humidity, etc. These environmental effects can cause moisture to form on the lens thereby decreasing the effectiveness of the camera.

SUMMARY OF THE INVENTION

It is therefore an object of the present invention to provide a system and method that provides for improved viewing of the area adjacent a vehicle.

Another object of the present invention is to provide a system and method that provides for improved viewing of the area behind a vehicle from within the passenger compartment.

A further object of the present invention is to provide a system for viewing the area adjacent a vehicle that can be properly and easily installed by end users.

A still further object of the present invention is to provide a system for viewing the area adjacent a vehicle that can be retrofit to existing vehicles.

A yet further object of the present invention is to provide a system for viewing the area adjacent a vehicle that transmits a wireless signal from the camera to the display device.

Another object of the present invention is to provide a system for viewing the area adjacent a vehicle that can transmit either a wired and/or wireless signal from the camera to the display device.

Yet another object of the present invention is to provide a system for viewing the area adjacent a vehicle that allows vertical flipping of the transmitted image.

Still another object of the present invention is to provide a system and method for viewing the area adjacent a vehicle that utilizes a camera that can be adjusted without requiring remounting of the camera.

An even further object of the present invention is to provide a system and method for viewing the area adjacent a vehicle that minimizes fogging of the camera lens.

A still further object of the present invention is to provide a system and method for viewing the area adjacent a vehicle that provides automatic activation/operation of the component devices.

A yet further object of the present invention is to provide a system and method for viewing the area adjacent a vehicle that utilizes a display device that can also display images received from a video player in addition to images transmitted from the camera component.

Even yet another object of the invention is to provide a vehicle having improved capabilities to monitor the adjacent areas.

These and other objects are met by the present invention, which in a first aspect can be a system for monitoring an area adjacent a vehicle comprising: a retrofit kit comprising a camera assembly, a display device and a stand for supporting the display device; the camera assembly comprising: (i) a camera adapted to produce an image signal corresponding to a perceived image, (ii) means for supplying power; (iii) a base having first and second holes that are configured and spaced from one another so as to facilitate attachment to the vehicle using the vehicle's license plate mounting bolts, (iv) a transmitter operably coupled to the camera for wirelessly transmitting the image signal; and the display device comprising: (i) a receiver for receiving the wirelessly transmitted image signal, (ii) means for supplying power, (iii) an image processing unit operably coupled to the receiver for converting the received image signal into a display image that is displayed on the display device, the display image corresponding to the perceived image.

In some embodiments, the base may comprise a base structure and a support structure adapted to support the display device. To improve the ability of the operator to view the display device, the support structure may be pivotally connected to the base structure. The support structure may also have means for securing the stand to a surface within a passenger compartment of the vehicle.

The camera may be pivotally connected to the base in certain embodiments so that the viewing angle of the camera can be adjusted without remounting the camera. In one embodiment, the camera may be pivotally connected to the base so as to pivot solely about a substantially horizontal axis when the base is mounted to the vehicle using the vehicle's license plate mounting bolts.

The system may also comprise an antenna operably connected to the transmitter. In such an embodiment, it may be preferred that the antenna extend from the camera assembly and be of a sufficient length so that when the camera assembly is mounted to the vehicle using the vehicle's license plate mounting bolts, the antenna can extend into a passenger compartment of the vehicle. Having the antenna located within the passenger compartment of the vehicle, as opposed to the exterior of the vehicle, facilitates improved wireless transmission of the image signal to the display device while staying within FCC mandated power levels.

In another embodiment, a video input port may be operably coupled to the image processor so that a video signal from a separate video player device can be displayed when the camera is not in use. In such an embodiment, a switching circuit may be provided for selecting whether the display image is based on the received image signal from the receiver (i.e., from the camera) or a video signal from the video input port.

In order to minimize the effects of the environment on the camera's functioning, the camera may also comprise a hermetically sealed space filled with an inert gas for preventing condensation on a lens of the camera.

In another aspect, the invention can be a system for monitoring an area adjacent a vehicle comprising: a stand for supporting the display device; a camera assembly comprising: (i) a camera adapted to produce an image signal corresponding to a perceived image, (ii) means for supplying power; (iii) a base configured to facilitate attachment to an exterior surface of the vehicle, (iv) a transmitter operably coupled to the camera for wirelessly transmitting the image signal; a display device comprising: (i) a receiver for receiving the wirelessly transmitted image signal, (ii) means for supplying power, (iii) an image processing unit operably coupled to the receiver for converting the received image signal into a display image that is displayed on the display device, the display image corresponding to the perceived image; and the stand comprising: (i) a base structure, (ii) a support structure adapted to support the display device, the support structure pivotally connected to the base structure, and (iii) means located on a bottom surface of the base structure for securing the stand to a surface within a passenger compartment of the vehicle.

In yet another aspect, the invention can be a system for monitoring an area adjacent a vehicle comprising: a stand for supporting the display device; a camera assembly comprising: (i) a camera adapted to produce an image signal corresponding to a perceived image, (ii) means for supplying power; (iii) a base configured to facilitate attachment to an exterior surface of the vehicle, (iv) a transmitter operably coupled to the camera for wirelessly transmitting the image signal; and a display device comprising: (i) a receiver for receiving the wirelessly transmitted image signal, (ii) means for supplying power, (iii) an image processing unit operably coupled to the receiver for converting the received image signal into a display image that is displayed on the display device, the display image corresponding to the perceived image; (iv) a video input port operably coupled to the image processor, and (v) a switching circuit for selecting whether the display image is based on the received image signal from the receiver or based on a video signal from the video input port.

In still another aspect, the invention can be a system for monitoring an area adjacent to a vehicle comprising: a camera assembly comprising: (i) a camera adapted to produce an image signal corresponding to a perceived image, (ii) means for supplying power, (iii) a base adapted for mounting to an exterior surface of the vehicle, and (iv) a transmitter operably coupled to the Camera for wirelessly transmitting the image signal; and a display device for displaying a display image, the display device comprising: (i) a receiver for receiving the wirelessly transmitted image signal, (ii) means for supplying power, (iii) an image processing unit operably coupled to the receiver for converting the received image signal into the display image, (iv) a video input port operably coupled to the image processor, and (v) a display switching circuit for selecting between displaying the received image signal as the display image and displaying a video signal from the video input port as the display image.

In a further aspect, the invention can be a system for monitoring an area adjacent a vehicle comprising: a camera assembly, a display device and a video cable; the camera assembly comprising: (i) a camera adapted to produce an image signal corresponding to a perceived image, (ii) means for supplying power, (iii) a base having first and second holes that are configured and spaced from one another so as to facilitate attachment to the vehicle using the vehicle's license plate mounting bolts, (iv) a transmitter operably coupled to the camera for wirelessly transmitting the image signal, and (v) a video-out port operably coupled to the camera for wired transmission of the image signal; the display device for displaying a display image, the display device comprising: (i) a receiver for receiving the wirelessly transmitted image signal, (ii) means for supplying power, (iii) an image processing unit operably coupled to the receiver for converting the received image signal into the display image, (iv) a video input port operably coupled to the image processor, and (v) a display switching circuit for selecting between displaying the received image signal as the display image and displaying a video signal from the video input port as the display image; and the video cable having a first end plug adapted for operable insertion into the video-out port of the camera assembly and a second end plug adapted for operable insertion into the video input port of the display device.

In a still further aspect, the invention can be a system for monitoring an area adjacent to a vehicle comprising: a camera assembly comprising: (i) a camera adapted to produce an image signal corresponding to a perceived image, (ii) means for supplying power, (iii) a base configured to facilitate attachment to an exterior surface of the vehicle, and (iv) a transmitter operably coupled to the camera for wirelessly transmitting the image signal; the display device for displaying a display image, the display device comprising: (i) a receiver for receiving the wirelessly transmitted image signal, (ii) means for supplying power, (iii) an image processing unit operably coupled to the receiver for converting the received image signal into the display image; and the camera being pivotally connected to the base.

In another aspect, the invention can be a system for monitoring an area adjacent a vehicle comprising: a base adapted to be rigidly mounted to the vehicle; a camera pivotally connected to the base and adapted to produce an image signal corresponding to a perceived image, wherein the base comprises an elongated plate extending from a first end to a second end, the camera pivotally connected to the base so as to be substantially equidistant from the first and second ends of the elongated plate, the elongated plate comprising first and second holes that are configured and spaced from one another so as to facilitate attachment to the vehicle using the vehicle's license plate mounting bolts; a transmitter operably coupled to the camera for wirelessly transmitting the image signal; a display device adapted to be mounted within a passenger compartment of the vehicle, the display device comprising a receiver for receiving the wirelessly transmitted image signal; an image processing unit operably coupled to the receiver for converting the received image signal into a display image that is displayed on the display device, the display image corresponding to the perceived image; and wherein the camera is pivotally connected to the base so as to pivot about a substantially horizontal axis when the base is mounted to the vehicle using the vehicle's license plate mounting bolts.

In a yet further aspect, the invention can be an automobile comprising: a passenger compartment having an automobile operator section; a rear portion; a camera assembly mounted to an exterior surface of the rear portion, the camera assembly comprising: (i) a camera adapted to produce an image signal corresponding to a perceived image adjacent the rear portion, (ii) power supply wires extending into the passenger compartment and operably connected to a power source, (iii) a transmitter operably coupled to the camera for wirelessly transmitting the image signal, and (iv) an antenna operably coupled to the transmitter, the antenna extending from the camera assembly and into the passenger compartment; and a display device positioned in the passenger compartment at a location visible from the operator section, the display device comprising: (i) a receiver for receiving the wirelessly transmitted image signal, (ii) a power supply, and (iii) an image processing unit operably coupled to the receiver for converting the received image signal into a display image that is displayed on the display device, the display image corresponding to the perceived image.

In a still further aspect, the invention can be an automobile comprising: a passenger compartment having an automobile operator section; a rear portion; a camera assembly mounted to an exterior surface of the rear portion, the camera assembly comprising: (i) a camera adapted to produce an image signal corresponding to a perceived image adjacent the rear portion, (ii) power supply wires operably connected to a power source, and (iii) a transmitter operably coupled to the camera for wirelessly transmitting the image signal; and a display device positioned in the passenger compartment at a location visible from the operator section, the display device comprising: (i) a receiver for receiving the wirelessly transmitted image signal, (ii) means for supplying power, (iii) an image processing unit operably coupled to the receiver for converting the received image signal into a display image that is displayed on the display device, the display image corresponding to the perceived image; (iv) a video input port operably coupled to the image processor, and (v) a switching circuit for selecting whether the display image is based on the received image signal from the receiver or a video signal from the video input port.

In another aspect, the invention can be an automobile comprising: a passenger compartment having an automobile operator section; a rear portion; a camera assembly mounted to an exterior surface of the rear portion, the camera assembly comprising: (i) a camera adapted to produce an image signal corresponding to a perceived image adjacent the rear portion, and (ii) power supply wires operably connected to a power source; and a display device positioned in the passenger compartment at a location visible from the operator section, the display device comprising: (i) a receiver for receiving the wirelessly transmitted image signal, (ii) a 12 volt cigarette-lighter plug adapter, and (iii) an image processing unit operably coupled to the receiver for converting the received image signal into a display image that is displayed on the display device, the display image corresponding to the perceived image; and a transmitter operably coupled to the camera for wirelessly transmitting the image signal, the transmitter located within the passenger compartment.

DETAILED DESCRIPTION OF THE DRAWINGS

Figure 1:
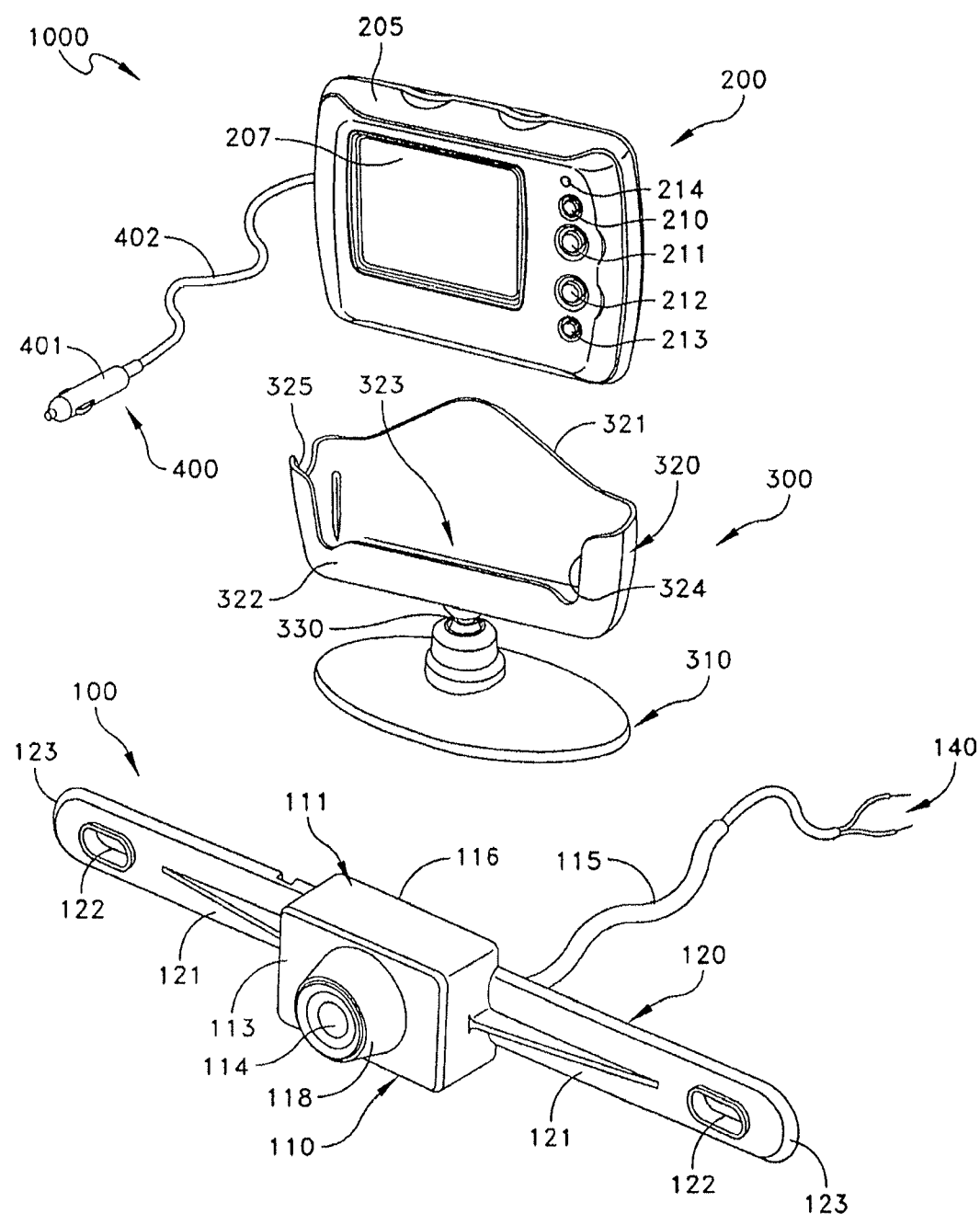
FIG. 1 is a perspective view of a backup camera system comprising a camera assembly, a display device and a stand according to one embodiment of the present invention.

Referring to FIG. 1 a backup camera system 1000 in accordance with one embodiment of the present invention is illustrated. The backup camera system 1000 generally comprises a camera assembly 100, a display device 200 and a stand 300. The backup camera system 1000 is designed so that when the backup camera system 1000 is installed on a vehicle, the operator of the vehicle will be able to view a desired area adjacent the vehicle from the operator section of the passenger compartment. While the backup camera system 1000 and its installation will be described throughout this application in relation to viewing the area directly behind the vehicle, it is to be understood that the invention can be used to view any area adjacent the vehicle if desired.

The backup camera system 1000 is specifically designed for ease of installation by the end user. As such, it is preferred that the backup camera system 1000 be a retrofit kit for installation onto existing vehicle's that do not have a factory-installed backup camera system. In one embodiment, the retrofit kit is to include, without limitation, the camera assembly 100 (or any of its alternative embodiments), the display device 200 (or any of its alternative embodiments), the stand 300, a 12 volt cigarette lighter adaptor 400 for supplying power to the display device 200 (and/or a wiring harness for providing power to the display device 200), fasteners for mounting the camera assembly 200 to an exterior surface of a vehicle (such as license plate nuts and bolts and/or screws), a fastener for securing the stand 300 to a surface within a passenger compartment of a vehicle (such as a hook-and-loop fastener, a piece of double-sided tape, etc.), cable ties, Scotch-Lok™ connectors, a video cable of sufficient length to facilitate the wired transmission of image signals from the camera assembly 100 to the display device 200, and a video cable 870C (FIG. 23) for supplying video signals from a separate video player to the display device 200. Of course, the retrofit kit may not include all of the aforementioned components. The exact components included in any retrofit kit will be dictated by the functional capabilities and structural particulars of the backup camera system 1000 to be provided and its intended installation.

Referring now to FIGS. 1 and 3A-3D concurrently, the structural aspects of the camera assembly 100 will be described in detail. With the exception of certain minor details, the camera assembly 100 is a symmetric structure with respect to both its horizontal and vertical axes. Generally, the camera assembly 100 comprises a camera portion 110 and a base portion 120. The base portion 120 is provided so that the camera assembly 100 can be mounted to the desired exterior surface of a vehicle. More specifically, the base portion 120 is adapted to be rigidly mounted to a vehicle using the vehicle's license plate mounting holes so that the camera portion 110 is facing rear of the vehicle so that objects behind the vehicle can be detected by the vehicle's operator, even when the objects are out of the operator's natural and/or mirror-assisted field of vision.

The base portion 120 comprises a pair of elongated flanges 121 that extend from the camera portion 110 in opposite directions. Stated another way, the flanges 121 extend in a lengthwise direction from the camera portion 110 at approximately 180° apart from one another. The flanges 121 can be formed from a single elongated plate or from separate plates that assembled to one another and/or the camera portion 110. Each flange 121 comprises a hole 122 extending through its major face. Each of the holes 122 are spaced an approximately equal distance from the camera portion 110 and an approximately equal distance from the ends 123 of the flanges 121.

The holes 121 are located and designed to be used to secure the camera assembly 100 to the vehicle using the vehicle's license plate mounting holes via fasteners 70 (FIG. 6), such as bolts or screws. Specifically, the holes 121 are separated from one another by a linear distance that corresponds to the standard linear distance between the license plate mounting holes of vehicles, which is typically between 6-flinches. The holes 121 are preferably oval shaped so as to provide a clearance in order to accommodate for differences that may exist between the license plate bolt holes of different vehicles. Of course, the holes 121 may have other geometric shapes depending upon the respective needs of the attachment devices and the hardware used.

Referring still to FIGS. 1 and 3A-3D concurrently, the camera portion 110 is centrally located on the base portion 120. The camera portion 110 comprises a housing 111 that encloses and protects all of the necessary electrical components (including the camera 130 and transmitter 125) and internal circuitry to achieve the functions of the backup camera system 1000 discussed in this application. The internal circuitry and electrical components of the camera assembly 200 are described in greater detail below in reference to FIGS. 7A, 8 and 9.

An opening 112 is provided in a truncated cone structure 118 that protrudes from the front wall 113 of the housing 111. The opening provides a viewing passageway for the internally located camera 130. The camera lens 114 protrudes from and encloses the opening 112. The camera lens 114 is connected to the housing 111 so that a hermetic seal is formed between the lens 114 and the housing 111, thereby hermetically sealing the opening 112. This can be accomplished through the use of an appropriate gasket seal, O-ring, adhesion, a threaded fit, thermal welding, or other means known in the art.

The lens 114 has a vertical viewing angle of up to 80° and a horizontal viewing angle of 110°. The vertical viewing angle may be up to 100° and the horizontal viewing angle may be up to 170°. The invention, however, is in no way limited by the viewing area of the lens utilized. The lens 114 has an ultra-violet coating for light gathering and amplification. In some embodiments, it may be preferred that the lens 114 be provided with an additional layer of coating in order to prevent scratching from small accidents or other events. Alternatively, the entire lens 114 may be constructed out of materials such as plastics, or polycarbonate.

The camera assembly 100 further comprises a wire 115 that extends from an opening 117 in the rear wall 116 of the housing 111. As will be discussed in greater detail below with respect to FIG. 4, the wire 115 comprises both the electrical power wires 140 that are to be connected to a power source of the vehicle and an external antenna cable 150 (or wire operably coupling an external transmitter to the camera 130). As with the opening 112, the opening 117 through which the wire 115 extends is preferably heretically sealed through the use of a gasket, O-ring or other means. Of course, the wire 115 can consist of multiple other cables. In other embodiments of the camera assembly 100, one or more female ports can be provided in the housing 111 and operably coupled to the internal circuitry as needed so that the power supply wires, antennas, video cables and other cables can be operably connected to the camera assembly 100.

The hermetic sealing of the housing 111 keeps liquids away from the electrical circuitry and components of the camera assembly 100, which will often be directly exposed directly to the harsh weather conditions during travel. As such, all possible openings into and out of the space within the housing 111 that holds moisture sensitive components should be sealed watertight, using a gasket seal, or some other type of mechanism that is able to prevent the entry of moisture. During manufacture, the space within the housing 111 is preferably backfilled and pressurized with an inert gas, which may be a non-reactive gas, such as $CO_2$, $N_2$ (nitrogen gas), or a noble gas such as helium, xenon, etc. in order to purge all moisture from the camera 111 and from the components of the transmitter 125. Removal of the moisture from the housing 111 prevents the lens 114 from becoming clouded or fogged when it is exposed to the variable conditions of the environment.

Figure 2:
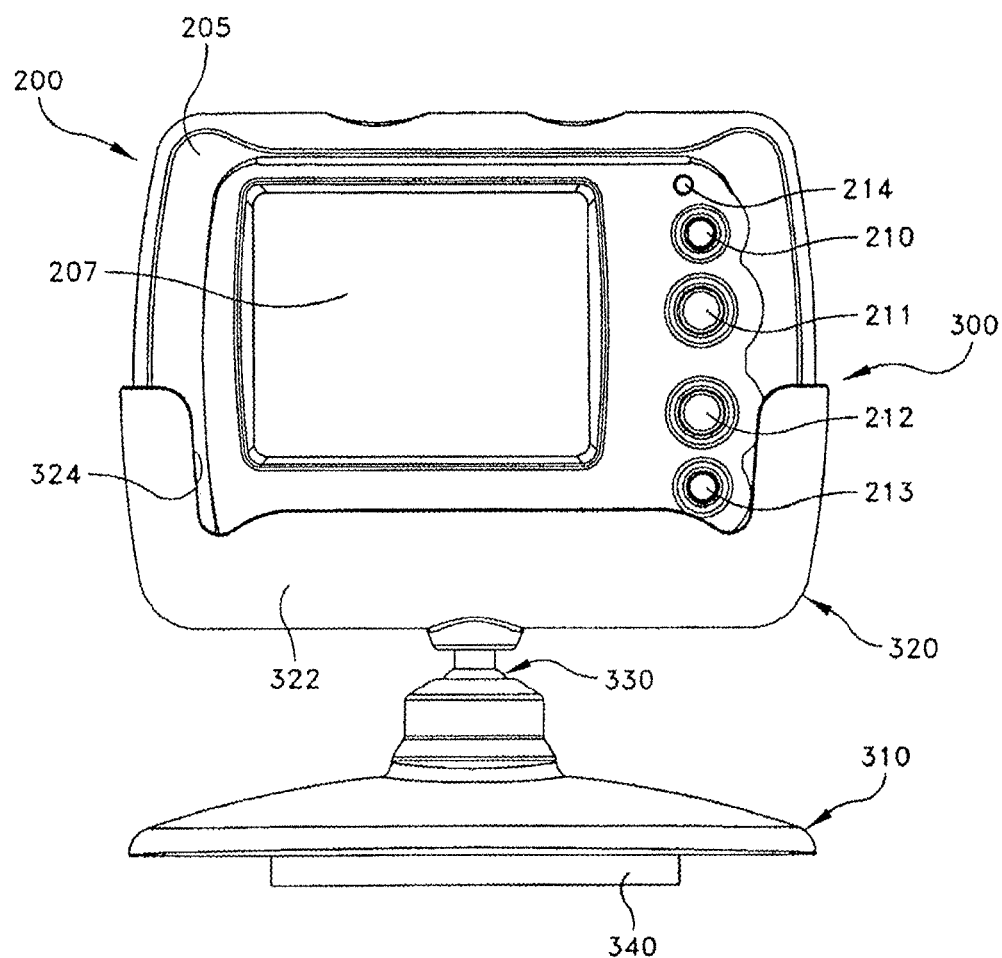
FIG. 2 is a front view of the display device of FIG. 1 positioned within the stand of FIG. 1.
Figure 3A:
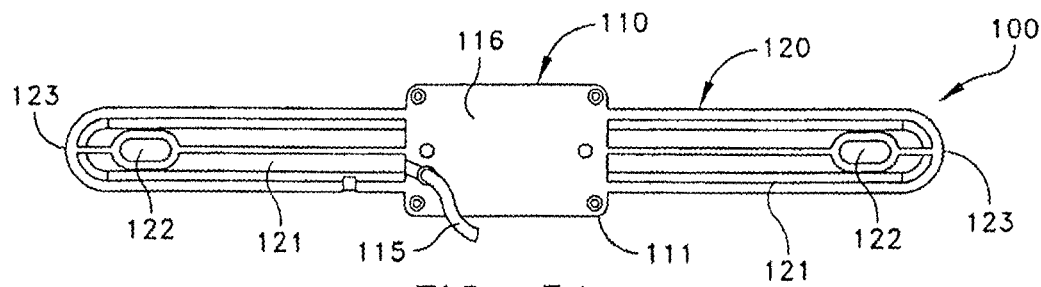
FIG. 3A is a rear view of the camera assembly of FIG. 1.
Figure 3B:
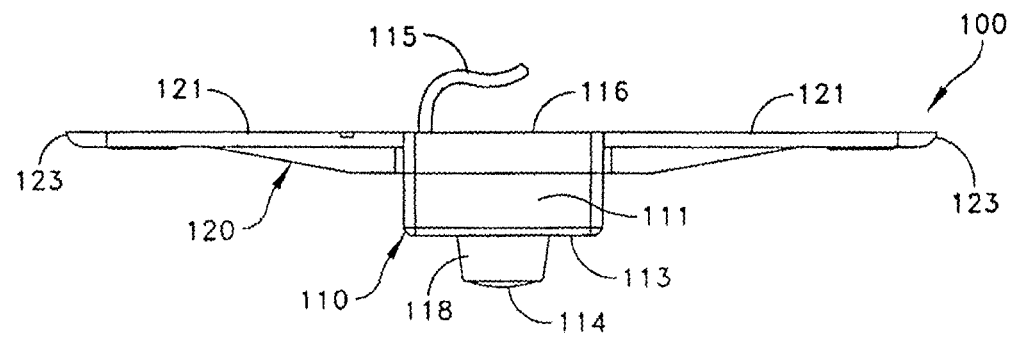
FIG. 3B is a top view of the camera assembly of FIG. 1.
Figure 3C:
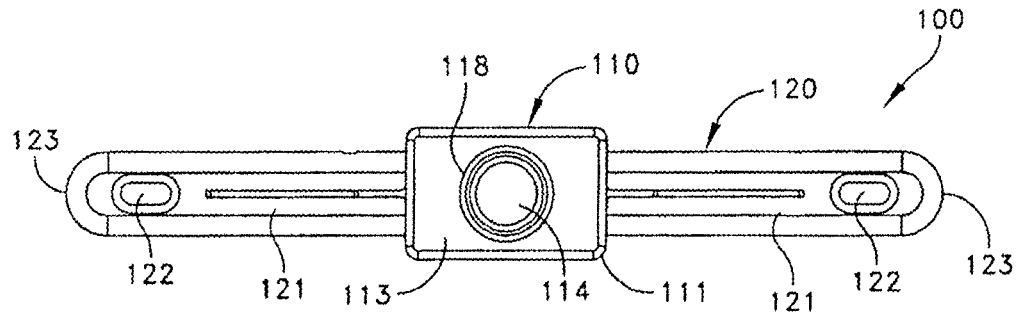
FIG. 3C is a front view of the camera assembly of FIG. 1.
Figure 3D:
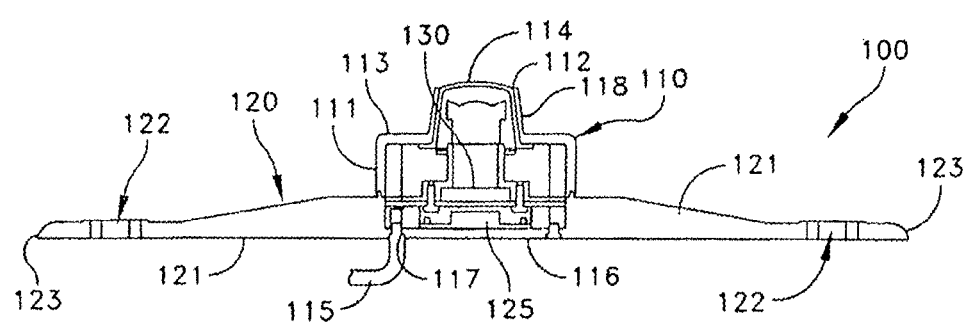
FIG. 3D is a cross-sectional view of the camera assembly FIG. 1 along the line A-A of FIG. 3C.

Referring now to FIGS. 1 and 2 concurrently, the structural and functional details of the stand 300 will be described. Generally, the stand 300 comprises a base structure 310 and support structure 320. The support structure 320 is pivotally connected to the base structure 310 via a swivel member 330, which is in the form of a ball joint. In other embodiments, the swivel member 330 may be an axel-like pivot structure or any other type of pivoting joint.

The support structure 320 is a sleeve-like structure that is adapted to receive and support the display device 200. The support structure 320 comprises a rear wall 321 and a front wall 322 that forms a cavity 323 therebetween. An open top end of the support structure 320 provides an opening through which the display device 200 can be slidably lowered into the cavity 323. The cavity 323 is sized and shaped to receive and accommodate the display device 200, thereby supporting the display device 200 in an upright position for viewing (as shown in FIG. 2).

The front wall 322 of the support structure 320 comprises a cutout 324. The cutout 324 is sized, shaped and positioned so that when the display device 200 is positioned within the cavity 323, the display screen 207 of the display device 200 is aligned with the cutout 324 so as to afford an unobstructed view of the display screen 220 and/or access to the controls 210-213 of the display device 200.

The support structure 320 further comprises a notch 325 in one of its side walls. The notch 325 is located on the support structure 320 so that when the display device 200 is positioned within the cavity 323, the notch is aligned with and provides access to a female power supply port (not illustrated) located on a side surface of the display device 200. As a result of this alignment, the jack end of the 12 volt cigarette lighter adapter 400 can be operably inserted into and removed from the display device 200 as desired without having to remove the display device 200 from the cavity 323 of the support structure 320. Depending on the number and location of ports and/or controls located on the display device 200, one or more notches, cutout and/or opening may be provided and suitably located on the support structure 320 so as to provide access to the ports and/or controls when the display device 200 is positioned within the cavity 323.

The support structure 320 also comprises a securing means (not visible) that secures the display device 200 to the support structure 320 so that the display device 200 can not become accidentally separated and/or dislodged from the support structure 320. The securing means can take on a wide variety of embodiments, such as a piece of double-sided tape located on either an inner surface of the cavity 323 of the support structure 320 or on the display device 200, a male-female snap-lock system co-operationally positioned on the support structure 320 and the display device 200, a hook-and-loop fastener system co-operationally positioned on the support structure 320 and the display device 200, a tight-fit assembly between the support structure 320 and the display device 200, a latching mechanism, a screw, a nut and bolt assembly, a threaded assembly, a strap, a band, etc. In the sleeve-like embodiment of the support structure 320, the relative size and shape of the cavity 323 of the support structure 320 with respect to the display device 200 is designed to cradle the display device 200 in a manner that prevents dislodgment.

Referring now solely to FIG. 2, the stand 300 further comprises a securing means, generically illustrated as box element 340, located on the bottom surface of the base structure 310. The securing means 340 is used to mount the stand 300 to an interior surface within the passenger compartment of the vehicle that is visible by the vehicle's operator, such as the dashboard surface. The securing means 340 may be an adhesive material, such as double-sided tape, that is placed on the bottom surface of the support structure 320 so that the stand 310. Alternatively, the securing means 340 may be a hook-and-loop fastener tape wherein either the hook tape or the loop tape is attached to the dashboard and the other one of the hook tape or the loop tape is attached to the base structure 310 of the stand 300. This permits the stand 300 to be easily placed and removed from the interior of the vehicle.

While the illustrated embodiment of the support structure 320 is a sleeve-like structure, the invention is not so limited. In other embodiment, the support structure 320 can take on a wide variety shapes, sizes and structural arrangements so long as it capable of supporting the display device 200.

Preferably the stand 300 and the display device 200 are placed in a location within the passenger compartment of the vehicle where the operator of the vehicle can see the display screen 207, such as the dashboard Alternatively, the display device 200 may be attached to the visors used in a vehicle, to the rear-view mirror, or to the windshield. When mounting the display device 200 directly to a visor or mirror it may not be necessary to use the stand 300.

Referring again to FIGS. 1 and 2 concurrently, the display device 200 of the backup camera system 1000 will be described in greater detail. The display device 200 is a compact structure that is designed to be placed within a passenger compartment of a vehicle at a location visible by the operator of the vehicle. The display device 200 comprises a housing 205 which acts as the main body of the display device 200. The circuitry and electrical components that enable the operation, functioning and control of the display device 200 are located within the housing 205. Reference can be made to FIGS. 6b, 9 and 10, and the corresponding discussion, for more detailed information regarding the circuitry and electrical components of the display device 200.

The display device 200 also comprises a display screen 207 for displaying images. The display screen 207 is preferably sized in order to provide the operator of a vehicle with an adequate view of the images displayed on the display screen 207. In one embodiment, the display screen 207 is roughly 2.5 inches when measured diagonally. However it is to be understood that the size of display screen 207 is in no way limiting of the present invention and can be any size desired. The exact size of the display screen 207 will depend upon the size of the vehicle's interior space, the viewing needs of the operator of the vehicle and the target price of the retrofit kit. The display screen 207 may be a thin film liquid crystal display, or alternatively some other type of display device that is capable of being able to produce an image.

The display device 200 further comprises a plurality of control buttons 210-213. The control buttons 210-213 are located on the front surface of the housing 205 adjacent the display screen 207. Both the display screen and control buttons 210-213 are visible when the display screen is supported by the stand 300. The control buttons 210-213 are operably connected to the corresponding circuitry and/or electrical components of the display device 200. As a result, the control buttons 210-213 control the various features and functions of the camera assembly 100 and/or the display device 200. While the user controls are exemplified as buttons 210-213, any other type of control mechanisms can be utilized to operate and/or control the components of the backup camera system 1000, including without limitation knobs, switches, slide switches, a touch screen, touch sensitive wheel, a remote control, a microphone for facilitating voice control, etc.

In the illustrated embodiment, the control buttons on the display device 200 include an increase brightness button 210, a view adjust button 211, a power button 212 and a decrease brightness button 213. The buttons 210-213 may be depressed to activate and/or deactivate the corresponding functionality.

Depressing the increase brightness button 210 increases the brightness of the display screen 207. Similarly, depressing the decrease brightness button 213 decreases/lowers the brightness of the display screen 207. If desired, the control features of the increase brightness button 210 and the decrease brightness button 213 can be combined into a single control button.

Depressing the view adjust button 211 results in a rotation and/or inversion of the image displayed on the display screen as compared to how that image is perceived by the camera assembly 100. For example, the view adjust button 211 (and its corresponding circuitry) is adapted to adjust and/or change the image displayed in the display screen 207 to be a forward image, a mirror image, a forward upside down image, a mirror upside down image, or some other alternative image type of the actual image perceived by the camera assembly 100. Depressing the view adjust button 211 results in a cycling of the different image types being displayed on the display screen 207.

Figure 20:
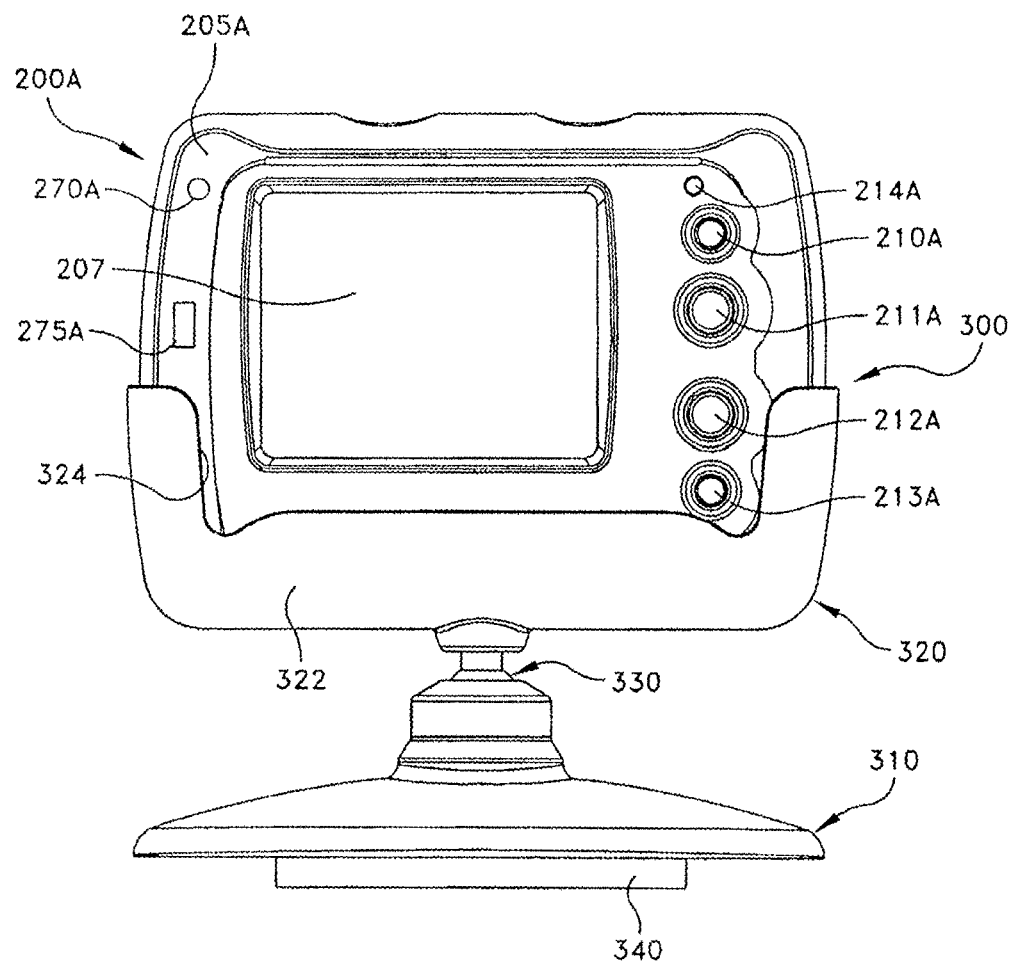
FIG. 20 is a front view of a first alternative embodiment of a multi-input display device that can be used in the backup camera system of FIG. 1, according to one embodiment of the present invention.

In the event that more than one camera assembly 100 is used in a single backup camera system 1000, it is possible to have the view adjust button 211 (and its corresponding circuitry) act as a switching mechanism that switches between displaying the images perceived by the different cameras assemblies of the backup camera system 1000. The view adjust button 211 (and its corresponding circuitry) can also act as a switching mechanism in embodiments where the display device 200 has multi-input capabilities (such as the embodiments of FIGS. 20-22, which are discusses later in this application). Of course, a separate control button and/or control mechanism can be used to manually cycle and/or switch between the different images and/or image types if desired.

The power button 212 turns the display device 200 on and off. In addition to the control buttons 210-213, the display device 200 also includes a status light 214 that indicates whether or not the display device 200 is powered on or not. The status light 214 is located on the front surface of the housing 205 so as to be visible from an operator section of the passenger compartment. It is to be understood that the display device 200 can have additional buttons, knobs and/or dials for controlling either the display device 200 or the camera assembly 100 as desired.

Furthermore, in some embodiments of the invention, certain functions can be automated by programming the internal processor of the display device 200 to automatically perform certain functions upon detecting an event, such as the presence of a signal. For example, in one embodiment of the invention, so long as the display device 200 is operably coupled to a power source, the display device 200 (and thus the display screen 207) is automatically activated upon receipt of an image signal sent from the transmitter of the camera assembly 100. Utilizing such automated activation of the display device 200 ensures that the operator of the vehicle has access to the visibility afforded by the backup camera system 1000 without being required to manually activate the display device 200. In a further embodiment, the circuitry of the display device 200 is designed so that the display device 200 (and thus the display screen 207) is automatically activated upon the starting the vehicle or when the car is placed into a certain gear, such as reverse.

In the exemplified embodiment, the backup camera system 1000 further comprises a 12 volt power adapter 400 for supplying power to the display device 200. The 12 volt power adapter 400 is a flexible power wire 402 comprising a first end having a cigarette-lighter plug 401 and a second end having a standard male jack (not illustrated) for inserting into the female power supply port (not illustrated) of the display device 200. Of course, other power supply wires and apparatus can be used. For example, the display device 10 can be powered by batteries. In another embodiment, the display device 200 is powered by a power cable attached to the vehicle's fuse block. This setup enables the display device 200 to be automatically activated when the vehicle is turned on.

In a further embodiment, the display device 200, as well as the camera assembly 100, can be hardwired to the reverse light circuit of the vehicle. This setup enables the display device 200 to be automatically activated when the vehicle is placed into reverse and automatically deactivated when the vehicle is placed into a gear other than reverse.

Figure 4:
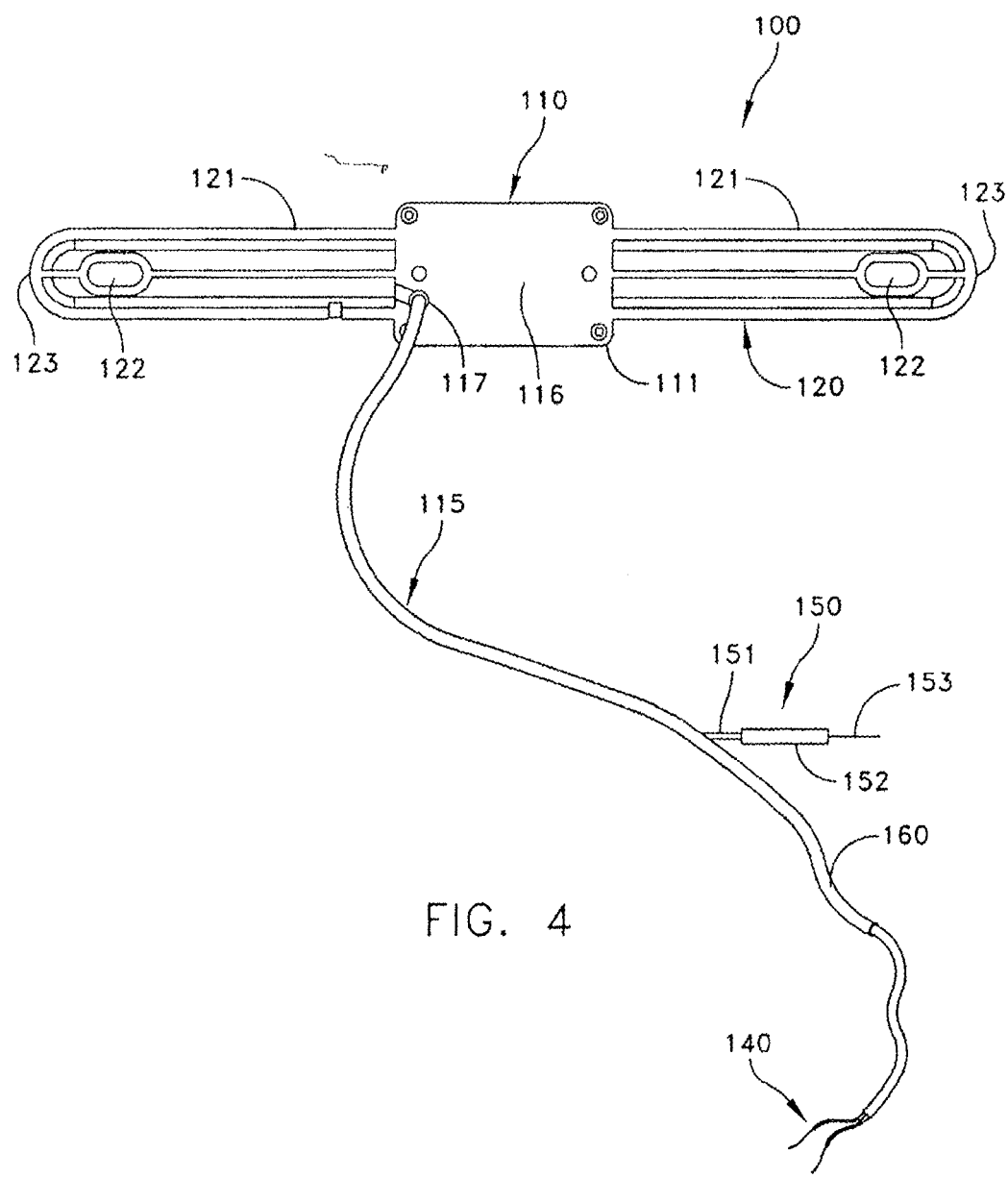
FIG. 4 is a rear view of the camera assembly of FIG. 1 wherein a portion of its antenna is removed from the wire casing.

Referring now to FIG. 4, the details of the power supply, antenna and wireless image signal transmission of the camera assembly 100 will be discussed. As discussed above, a wire 115 extends from the rear wall 116 of the housing 111 (which holds the circuitry and electrical components of the camera assembly). In reality, the wire 115 is actually a combination of multiple wires and antenna components. More specifically, the wire 115 comprises power supply wires 140 and an external antenna cable 150. The external antenna cable 150 runs adjacent to the power supply wires 140. This adjacent relationship between the external antenna cable 150 and the power supply wires 140 is achieved by encasing the external antenna cable 150 and the relevant portion of the power supply wires 140 with a piece of heat shrink tubing 160 (a portion of the external antenna cable 150 is shown removed from the heat shrink tubing 160 for illustrative purposes). Of course, other equivalent structures can be used to maintain the adjacent relationship between the external antenna cable 150 and the power supply wires 140, including without limitation clasps, ties, bands, adhesion, string, thermal welding, clamps, etc. While maintaining the external antenna cable 150 adjacent to the power supply wires 140 is preferred, the external antenna cable 150 may not be so maintained in some embodiments.

The power supply wires 140 are of a sufficient length so that when the camera assembly 100 is mounted to an exterior surface of a rear portion of a vehicle, such as the license plate, the power supply wires 140 can be extended into the passenger compartment of the vehicle and operably connected to a power source, such as the reverse light circuit. In one embodiment, the power supply wires 140 are between 8 to 12 feet. Similarly, the external antenna cable 150 is of a sufficient length so that when the camera assembly 100 is mounted to an exterior surface of a rear portion of a vehicle, such as the license plate, the external antenna cable 150 also extends into the passenger compartment. In one embodiment, the external antenna cable 150 is between 8 to 16 inches in length. Thus, maintaining the adjacent relationship between the external antenna cable 150 and the power supply wires 140 with the heat shrink tubing 160 ensures that the external antenna cable 150 extends into the passenger compartment of the vehicle during installation and hook-up of the camera assembly 100 to a power source within the passenger compartment of the vehicle. As used throughout this specification, the passenger compartment of the vehicle includes the trunk area, passenger area and operator area of the vehicle.

While the exemplified embodiment of the camera assembly 100 of FIG. 4 utilizes power supply wires 140 for power, other embodiments of the camera assembly may 100 utilize an internal power supply, such as a battery, to supply the necessary power to the camera assembly 100. In still other embodiments, the power supply of the camera assembly 100 can be provided by a cable that operably attached to the display device 200. Such a wire can serve the dual function of signal transmission and power supply in hard-wired embodiments of the backup camera system 1000.

Still referring to FIG. 4, the external antenna cable 150 comprises a coaxial cable 151. A first end of the coaxial cable 151 is operably coupled to the transmitter 125 (FIG. 3D) located within the housing 111 while a second end is adapted to act as an antenna. More specifically, the second end of the coaxial cable 151 comprises a ground plane housing 152 and an antenna portion 153 extending therefrom. The antenna portion 153 wirelessly transmits the image signal that corresponds to image perceived by the camera 130. Of course other arrangements can be used for the antenna. For example, a simple wire may extend from the transmitter that acts as an antenna.

By utilizing an external antenna arrangement and positioning the antenna cable 150 within the passenger compartment of the vehicle, the 2.4 GHz wireless image signal emitted from the transmitter 125 does not have to penetrate the steel body of the vehicle and has to travel a reduced distance to the wireless signal receiver located within the display device 200 (which is positioned at a location viewable by the operator of the vehicle). As a result, the likelihood of the emitted wireless image signal arriving at the receiver with sufficient strength so as to yield a stable image on the display screen 207 is increased. This is important because the output power of the transmitter 125 of the camera assembly 100 may not be increased above certain thresholds in the U.S. due to FCC regulations.

In an alternative embodiment of the camera assembly 100, the entire transmitter itself may be located externally of the housing 111 and operably coupled to the camera 130 via a flexible cable/wire. In such an embodiment, the transmitter may be located within a second housing that is located within the passenger compartment of the vehicle. As with the other embodiments, locating the entire transmitter inside the vehicle improves the signal strength and reduces interference from external devices.

In another alternative embodiment of the backup camera system 1000, the camera assembly 100 may be hard-wired directly to the display device rather than utilizing a wireless signal. In fact, as will be discussed in greater detail below with respect to FIG. 23, the backup camera system 1000 can be adapted to have both wired and wireless signal transmission capabilities.

Figure 5A:
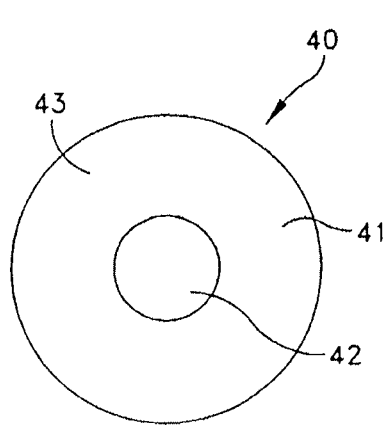
FIG. 5A is a front view of a positioner that can be used for mounting the camera assembly of FIG. 1 at an angle, according to one embodiment of the present invention.
Figure 5B:
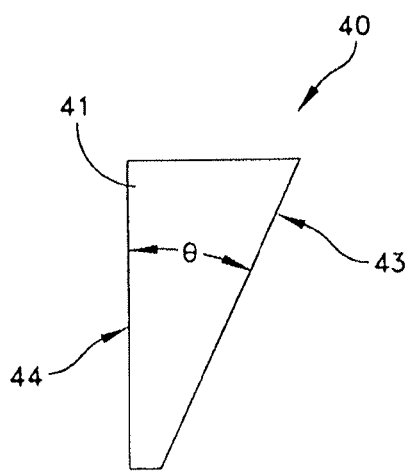
FIG. 5B is a side view of the positioner of FIG. 5A.

Referring now to FIGS. 5A and 5B concurrently, the details of the positioners 40 provided with the retrofit kit to mount the camera assembly 100 to an exterior surface of a vehicle that optimizes the vertical viewing angle will be described. The positioners 40 comprise a ring-like body 41 that forms an internal hole 42. The hole 42 is circular in shape and extends through the body 41 of the positioner 40 from the front surface 43 to the rear surface 44. While not illustrated, the inner surface of the positioner 40 that forms the hole 42 may be sloped/tapered so as to assist in the proper orientation and guiding of a fastener (e.g., screw 70)

through the hole 42 during the mounting process. While the positioner 40 is exemplified as a generally circular ring-like structure, other shapes can be utilized, such as u-shape, rectangular, etc. The positioners 40 can be made of any material, including without limitation flexible plastics, rubbers, metals, metal alloys, wood, etc. A flexible and/or resilient material is preferred but not necessary.

The side view of the positioner 40 shown in FIG. 5B revels that the positioner 40 is a tapered structure (with respect to its thickness). The tapered nature of the positioner 40 is achieved by orienting the front and rear surfaces 44, 43 at an acute angle θ with respect to one another. The angle θ is preferably between 15-75°. However, the exact angle θ to be used will depend on the specific needs of the vehicle to which the camera assembly 100 is to be mounted, such as the distance between the mounting location of the camera assembly 100 and the ground (e.g. the difference between the height of a sports utility vehicle and a sedan).

In the exemplified embodiment of the positioner 40, the front surface 43 slopes downward toward the rear surface 44 thereby forming a wedge-like structure. When used to mount the camera assembly 100, the tapered/wedge nature of the positioner 40 allows the user to orient the camera assembly 130 at an angle θ with respect to the surface of the vehicle to which the camera assembly 100 is mounted. The positioners 40 allow the user to install the camera assembly 100 at a vertical angle that optimizes the viewing area for his/her specific vehicle.

In some embodiments of the retrofit kit and/or backup camera system 1000, a plurality of sets of positioners 40 wherein each set has different angles θ may be provided so that the user can select a most optimal mounting angle for that specific vehicle.

Figure 6:
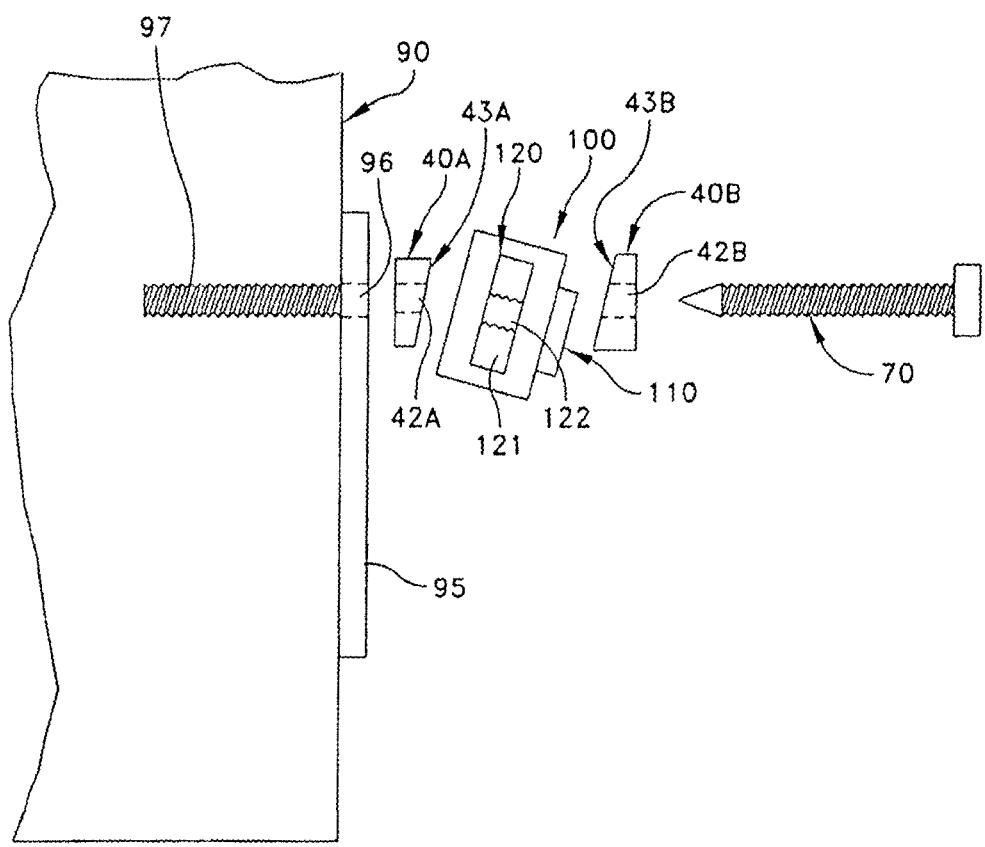
FIG. 6 is a schematic illustrating the mounting of the camera assembly of FIG. 1 to an exterior surface of a vehicle using the positioner of FIG. 5A, according to one embodiment of the present invention.

Referring now to FIG. 6, an embodiment of a procedure for mounting the camera assembly 100 to a rear portion 90 of a vehicle utilizing the positioners 40 will be described. First, four positioners 40 having the desired angle θ are selected. The camera assembly 100 is then aligned with the desired mounting area on the vehicle, which in the illustration is over the license plate 95. More specifically, the camera assembly 100 is aligned with the license plate 95 so that the holes 122 on the elongated flanges 120 of the camera assembly are aligned with the plate holes 96.

A first pair of positioners. 40A are then positioned between license plate 95 and the camera assembly 100 so that the holes 42A are aligned with the holes 96 and the flange holes 122. The sloped surface 43A of the positioners 40A face away from the vehicle and slope downward toward the vehicle. A second pair of positioners 40B are then position on the opposite side of the camera assembly 100 so that the holes. 42B are also aligned with the plate holes 96, the holes 42A and the flange holes 122. The sloped surface 43B of the positioners 40B face the vehicle and also slope downward toward the vehicle.

Screws 70 (or other fastener) are then inserted through the holes 42B of the second positioners 40B, through the flange holes 122 of the camera assembly 100, through the holes 42A of the first positioners 40A, through the plate holes 96 and into the license plate mounting holes 96 of the vehicle. Through threaded engagement, the camera assembly 100 is mounted to the rear portion 90 of the vehicle.

The two pairs of positioners 40A, 40B cooperate to not only orient the camera assembly 100 so that it is pointing downward in an angled manner from the vehicle but also give the head of the screws 70 a flush surface to which to engage. The angled mounting permits the camera assembly to view at an optimal vertical angle.

It should be understood that mounting the camera assembly 100 is not limited to the method described above. Other means for mounting the camera assembly 100 to the vehicle may be used, such as adhesives, magnets, etc. It may also be possible to mount the camera assembly 100 so that the direction in which it points is controllable from the inside of the vehicle. This may be accomplished though the use of servo-motors or other devices operably attached to the interior of the camera assembly 100 so that it can adjust and orient the camera 130.

Figure 7A:
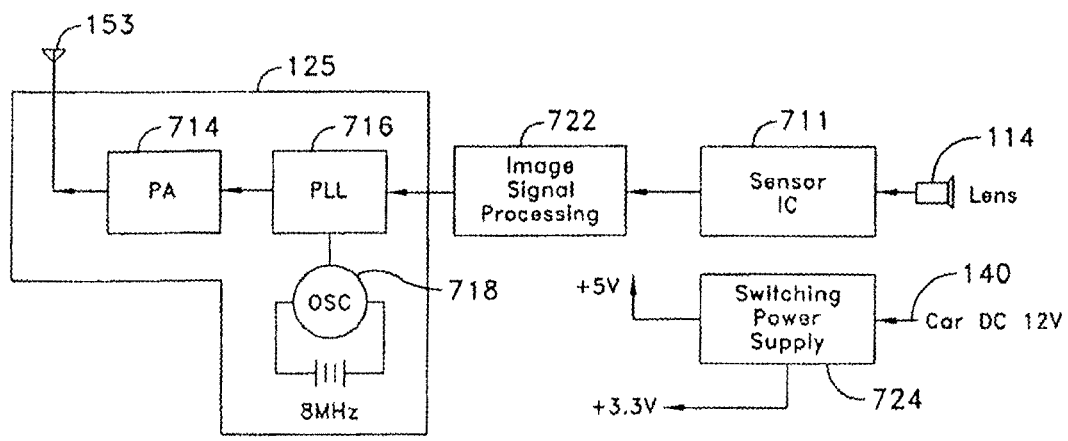
FIG. 7A is a high level electrical schematic of the camera assembly of FIG. 1, according to one embodiment of the present invention.

Referring now to FIG. 7A, a high level schematic of the electronic components and circuitry of the camera assembly 100 is illustrated. As mentioned above, these electronic components and circuitry are located within the housing 111 in one embodiment of the instant invention. An image sensor 711 is operably connected to the lens 114. The image sensor 711 converts light received through the lens 114 (which corresponds to a perceived image) into electrical impulses. The image sensor 711 may be a CMOS, or some other appropriate sensor.

The image sensor 711 is operably coupled to an image signal processing circuit 722. The image signal processing circuit 722 takes the information (which is in the form of electrical impulses) received from the image sensor 711 and converts it into an image signal having a format that can be used by the display device 200. Connected to the image signal processing circuitry 722 is a transmitter 125. The transmitter 125 comprises a 8 Mhz crystal controlled oscillator 718, a phased locked loop 716 and a phase array 714. The a 8 Mhz crystal controlled oscillator 718 and the phased locked loop 716 generate a 2.4 GHz RF signal based on the received image signal from the image signal processing unit 722. This produced signal is then sent to the phase array 114 for isolation and amplification. The amplified signal is then sent to the antenna 153, is tuned for 2.4 GHz, and wirelessly transmitted to the display device 200. It is possible to transmit the signal at other frequencies if desired.

The circuitry of the camera assembly 100 also includes a switching power supply circuit 724. The switching power supply circuit 724 is provided for creating+3.3 V and +5V from the 12 volt DC energy from the vehicle. This provides power to the camera 130. The power is typically gathered through the power supply wires 140, shown in FIG. 4, which are attached to the wire that lights the reverse lights. This in turn activates the camera 130 and its circuitry when the vehicle is placed in reverse.

Figure 7B:
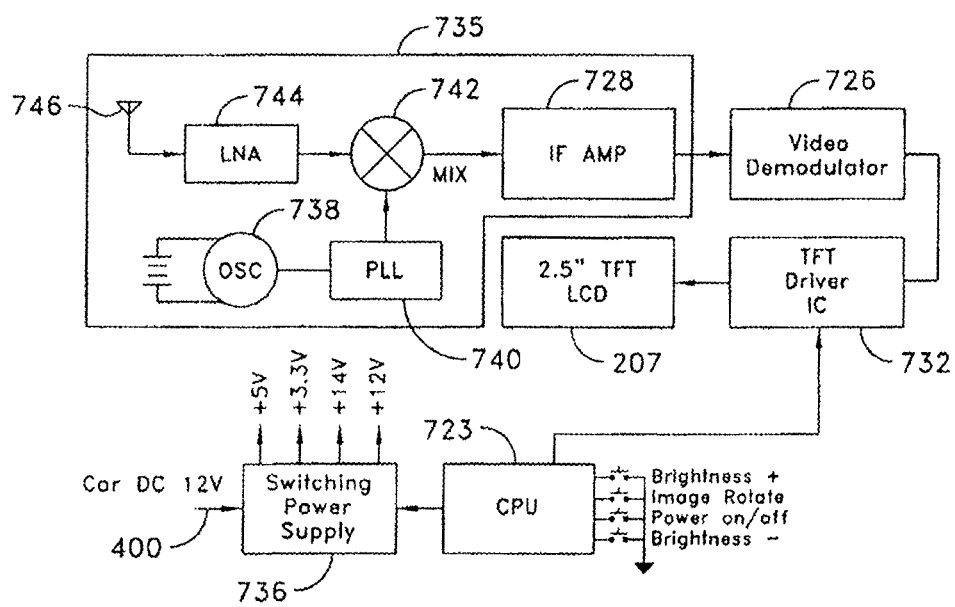
FIG. 7B is a high level electrical schematic of the display device of FIG. 1, according to one embodiment of the present invention.

Referring now to FIG. 7B, a high level schematic of the electronic components and circuitry of the display device 200 is illustrated. The electrical components and circuitry of the display device 200 perform a number of functions, including without limitation, transforming the wireless image signal received from the camera assembly 100 into an image displayed on the display screen 207, powering the display device 200, and executing user commands inputted via the controls 210-213.

The wireless transmitted image signal is received by the receiving antenna 746 and transmitted to the receiver 735. In the exemplified embodiment, the receiving antenna 146 is tuned to 2.4 GHz. It should be understood that the receiving antenna 146 may be tuned to whatever frequency at which the image signal is transmitted. If desired, the circuitry can be adapted to include a controller that automatically activates the display device 200 upon receipt and/or detection of a received image signal. Such automatic activation of the display device 200 eliminates the need for a separate action from the user, thereby ensuring that the area behind the vehicle is displayed on the display device at the necessary times.

Still referring to FIG. 7B, the receiver 735 comprises a low noise amplifier (LNA) 744, an 8 MHz crystal controlled oscillator 738, a phase locked loop (PLL) 740, a mixer 742 and an intermediate frequency amplifier 728. The LNA 744 boosts the 2.4 GHz signal that is received via the receiving antenna 746. The 8 MHz crystal controlled oscillator 138 and the PLL 140 generate a base frequency. The mixer 742 is connected to the LNA 744 and the PLL 740. The mixer 742 combines the received 2.4 GHz signal and the base frequency to create an intermediate frequency (IF) signal. The IF signal is transmitted to the intermediate frequency amplifier 128 which increases the strength of the IF signal.

The IF signal is then transmitted to a video demodulator 726. The video demodulator 726 strips away the IF and leaves only the image signal, which is then sent to an integrated circuit 732. In the exemplified embodiment, the integrated circuit 132 is a thin film technology (TFT) driver circuit.

The TFT driver circuit 132 sets up and supplies the correct signals for the display screen 207. As discussed above, the display screen 207 shows the visual images associated with the image signals. The TFT driver circuit 132 is connected to both the display screen 207 and the central processing unit (CPU) 723. The CPU 723 controls the receiver functions, uses image enhancement software, enables image rotation and/or inversion, and provides color. The CPU 723 receives the signals generated from the operation of the controls 210-213 of the display device 200 and performs the appropriate action. For example, when the brightness is adjusted, or the image angle is to be switched, the CPU 723 receives the signal and acts upon it. Image rotation and inversion is provided so that in the event that the camera assembly 100 is mounted incorrectly, the image may be simply adjusted so that there is no need to remount the camera assembly 100.

The CPU 723 is also connected to a switching power supply circuit 736 which creating the +3.3V, the +5V, the +12V, and the +14V from the 12 DC voltage provided by the vehicle from the adapter 400.

Figure 8A:
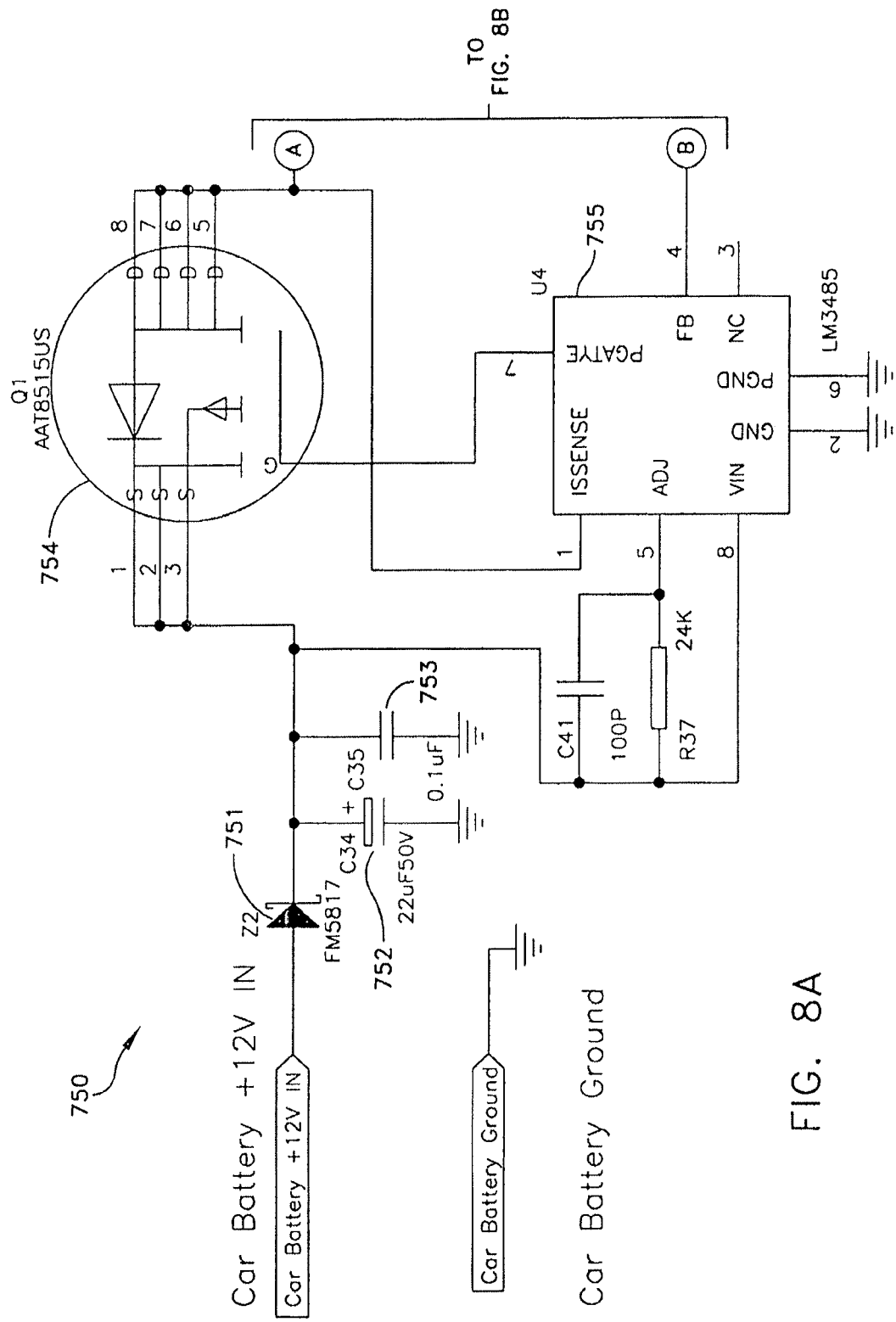
FIG. 8A-8C collectively form an electrical schematic of an image sensor circuit of the camera assembly of FIG. 1, according to one embodiment of the present invention.
Figure 8B:
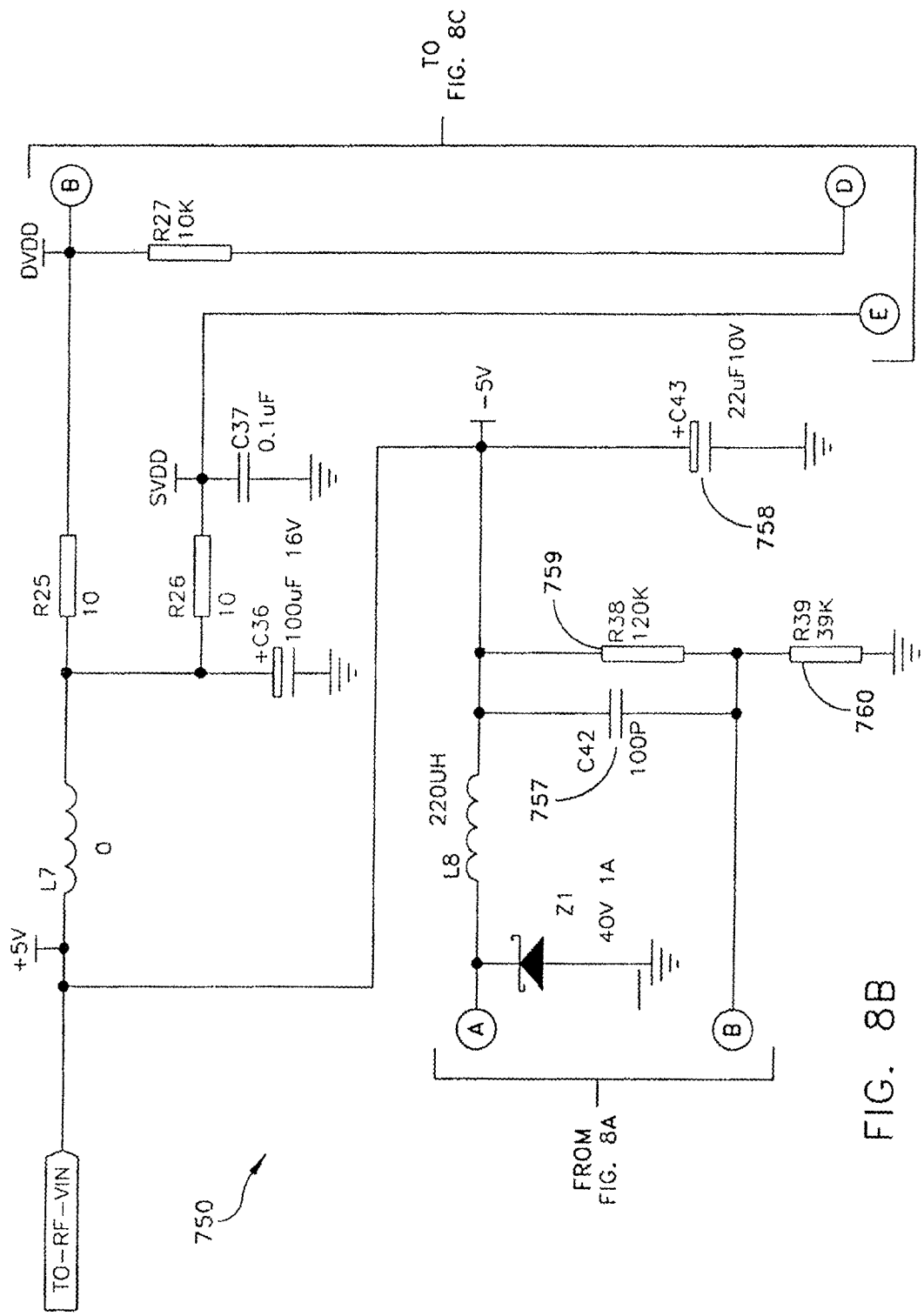
Figure 8C:
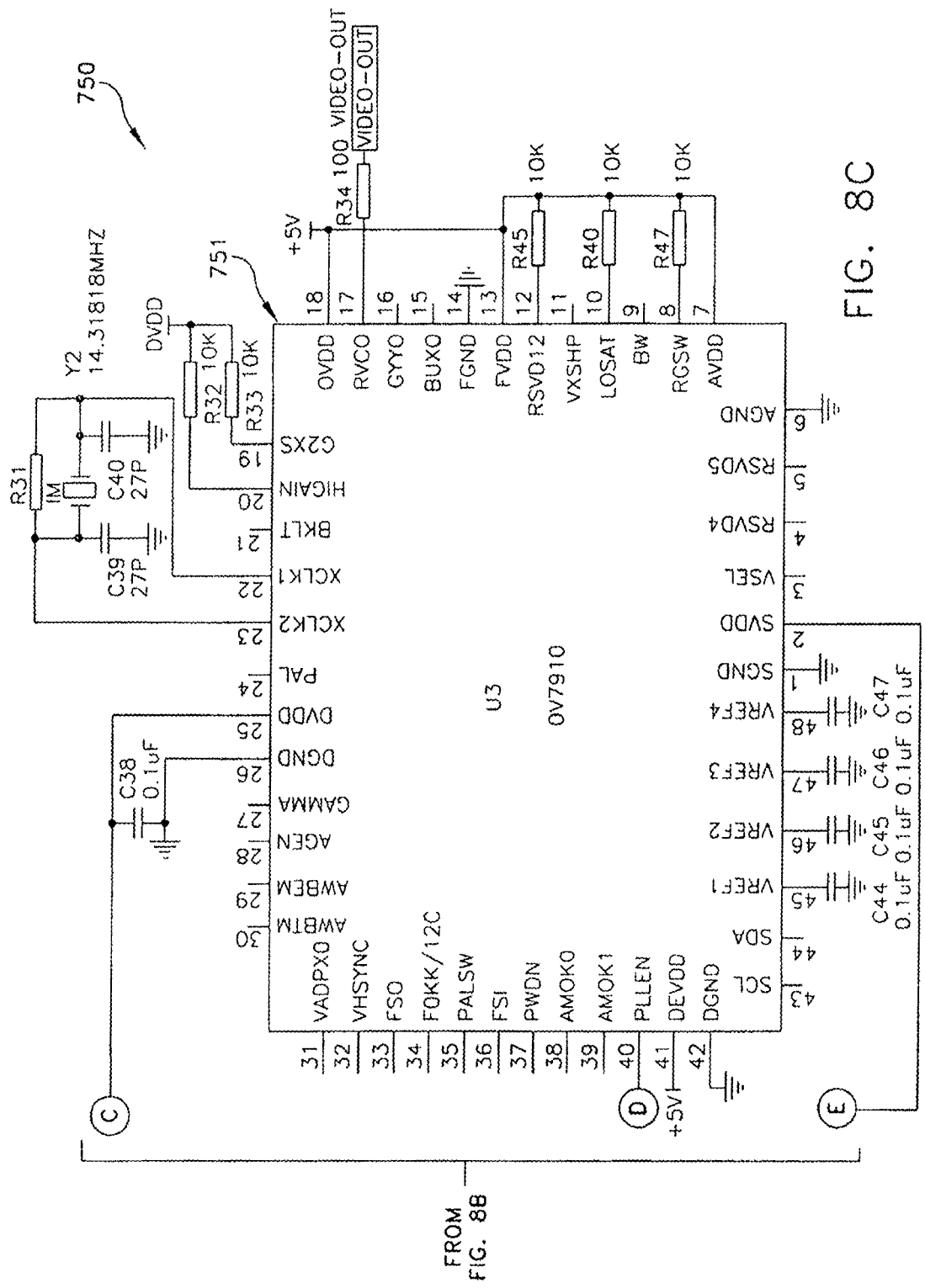
Figure 9A:
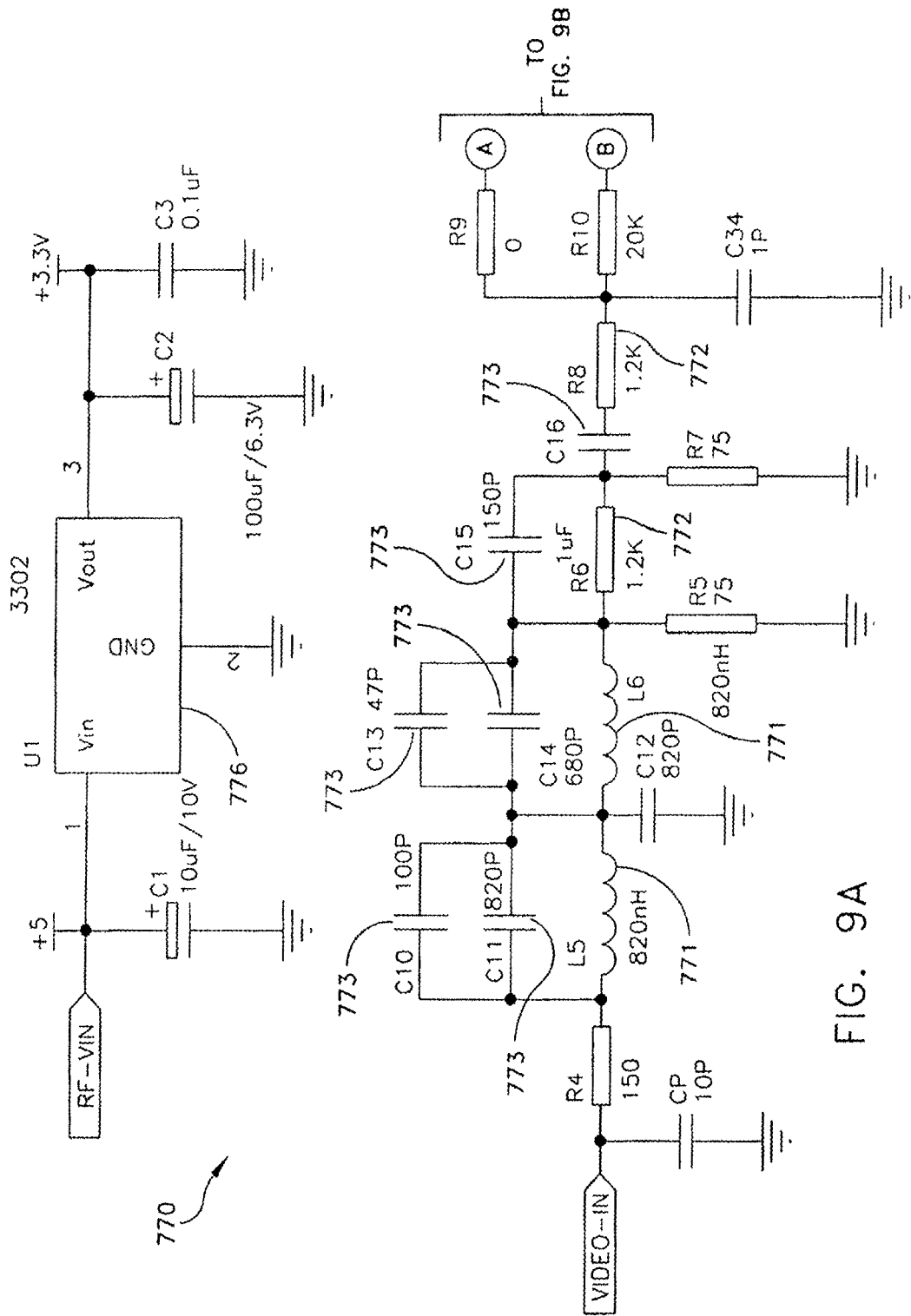
FIG. 9A-9D collectively form an electrical schematic of the transmitter circuit of the camera assembly of FIG. 1, according to one embodiment of the present invention.
Figure 9B:
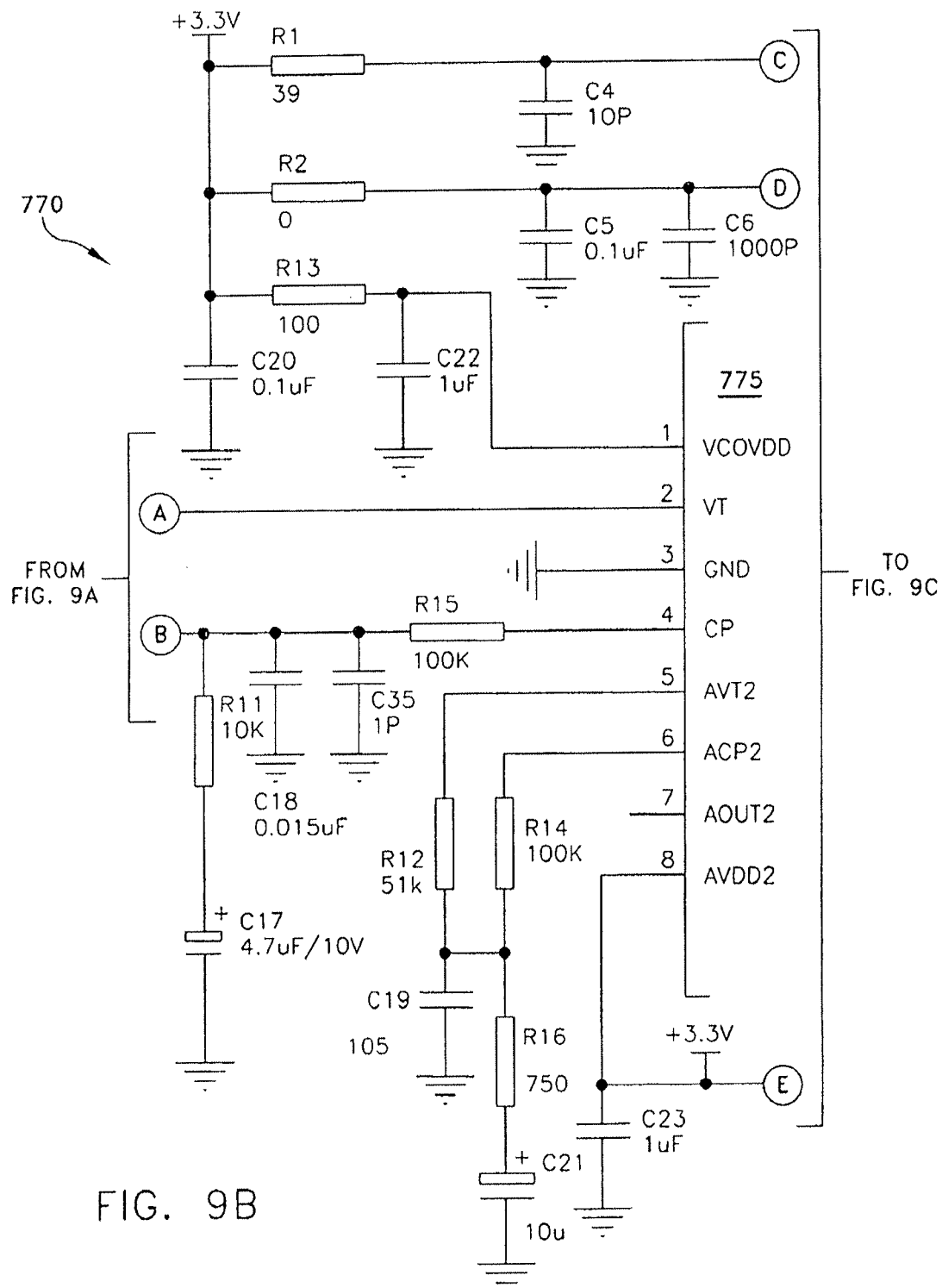
Figure 9C:
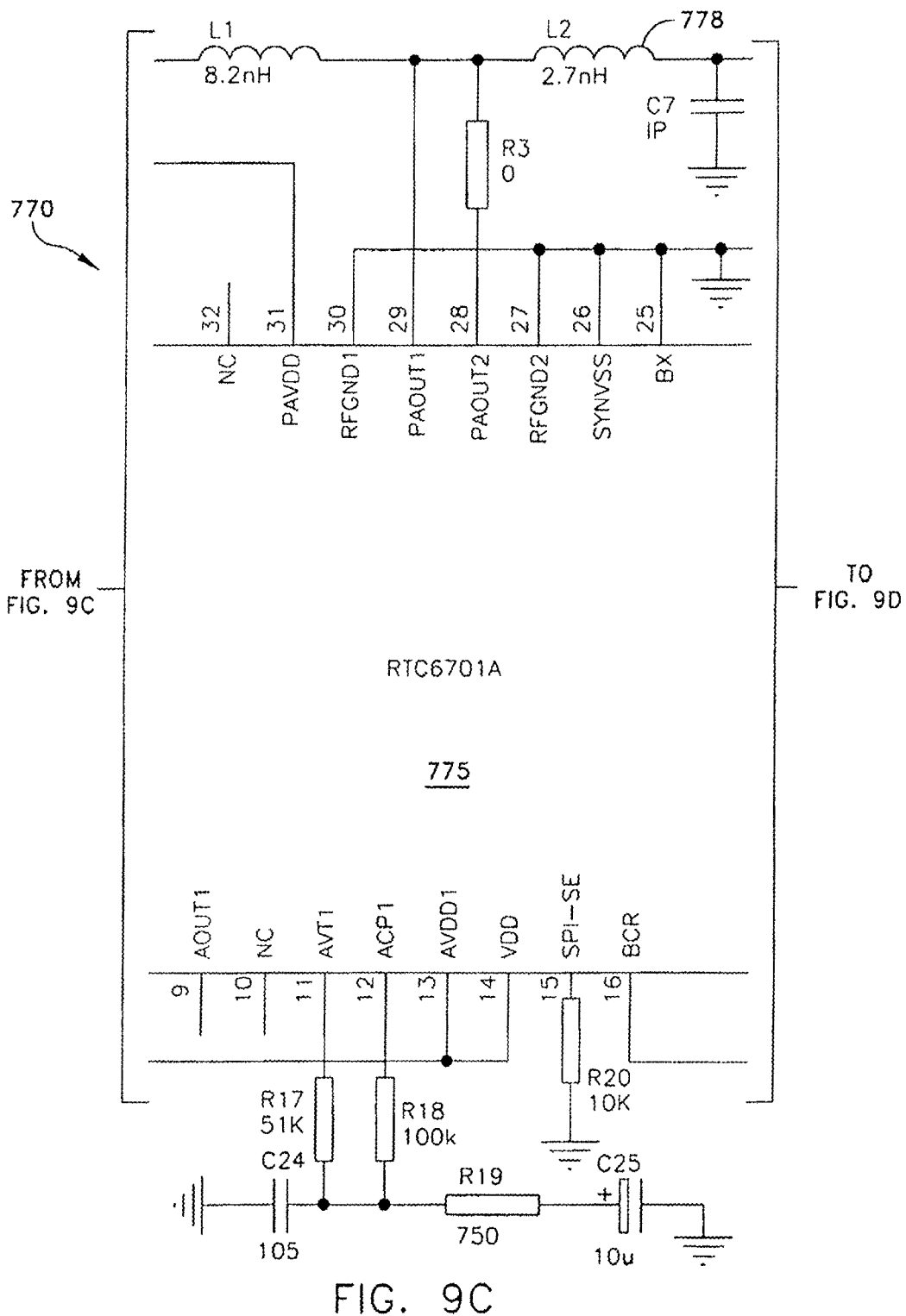
Figure 9D:
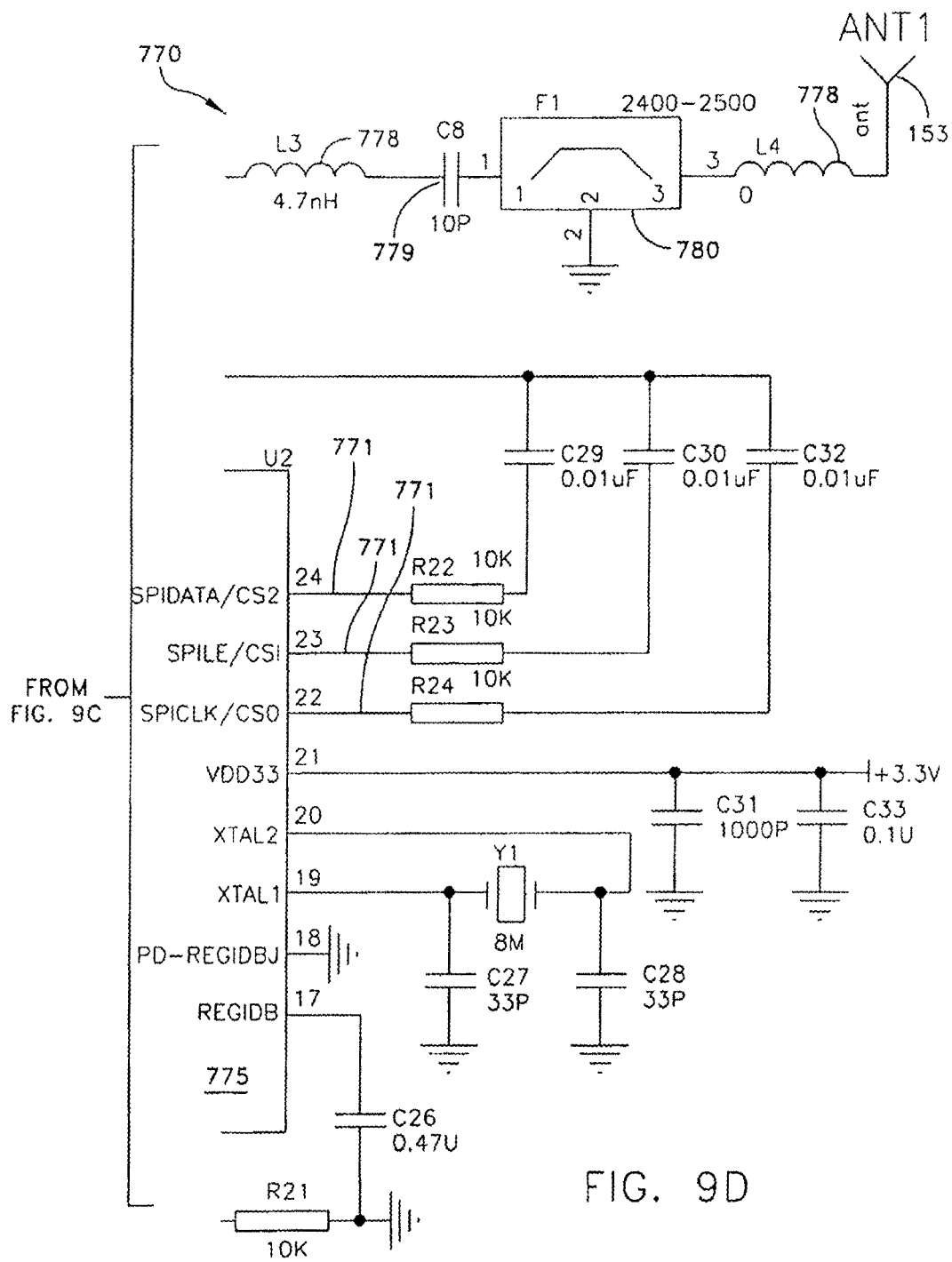
Figure 10A:
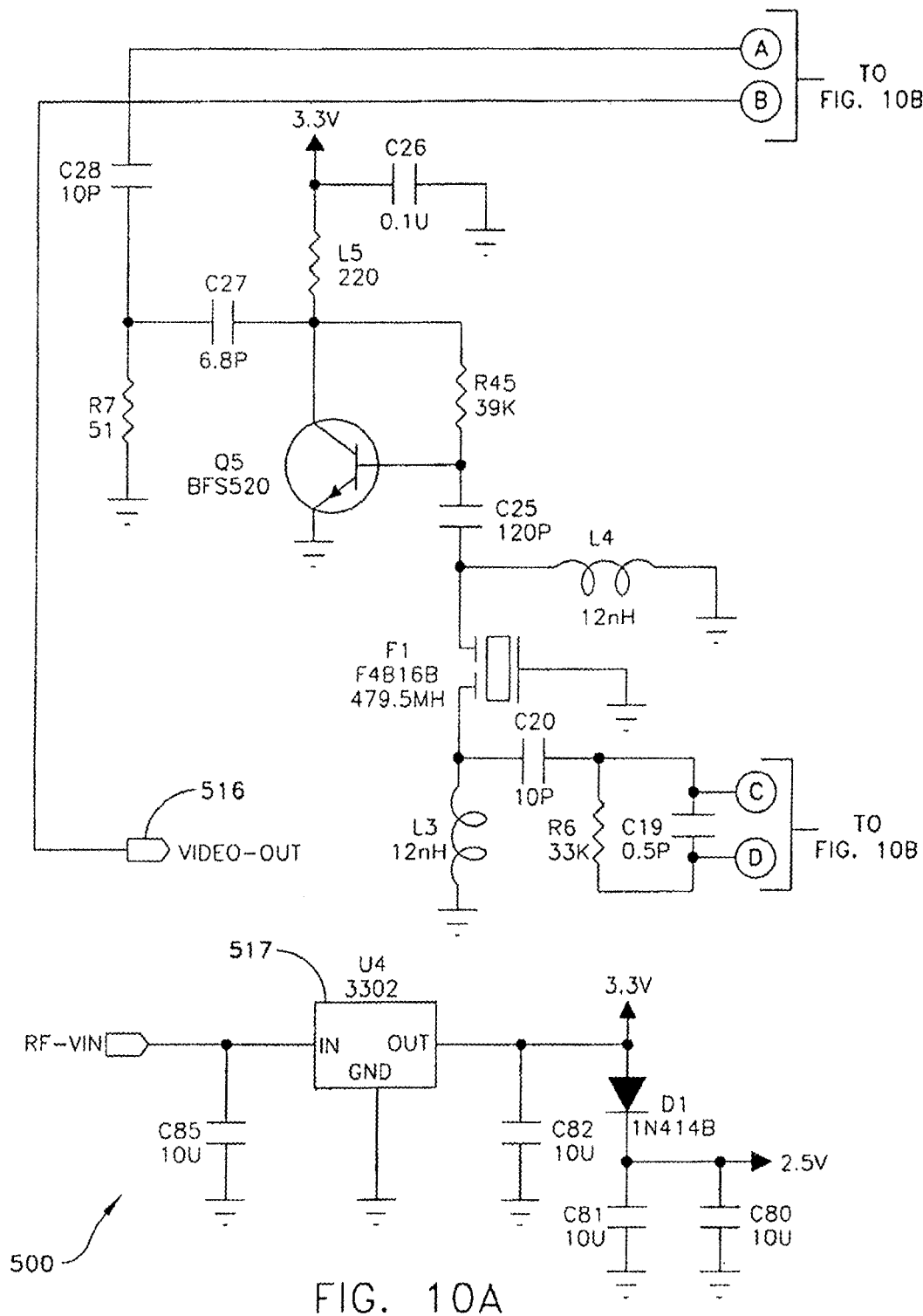
FIG. 10A-10D collectively form an electrical schematic of a receiver circuit of the display device of FIG. 1, according to one embodiment of the present invention.
Figure 10B:
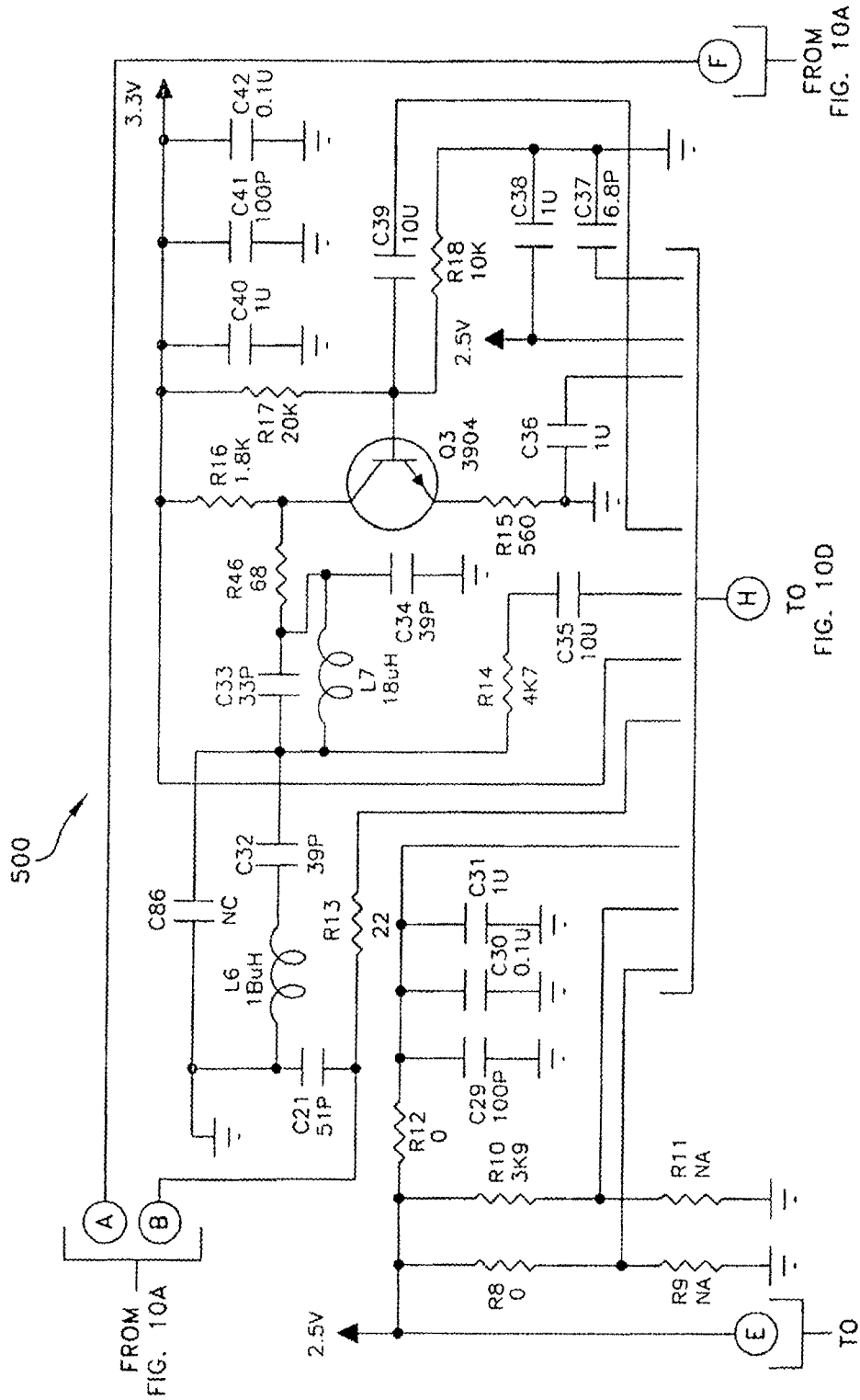
Figure 10C:
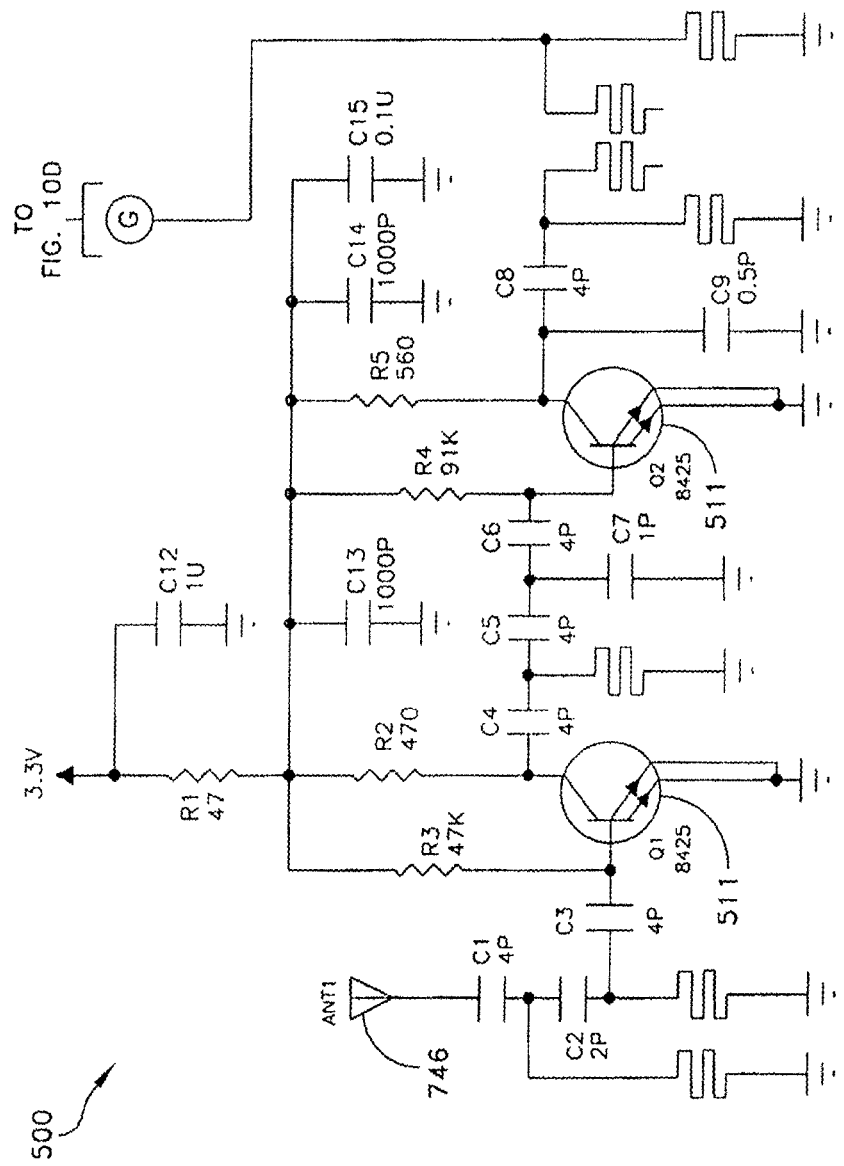
Figure 10D:
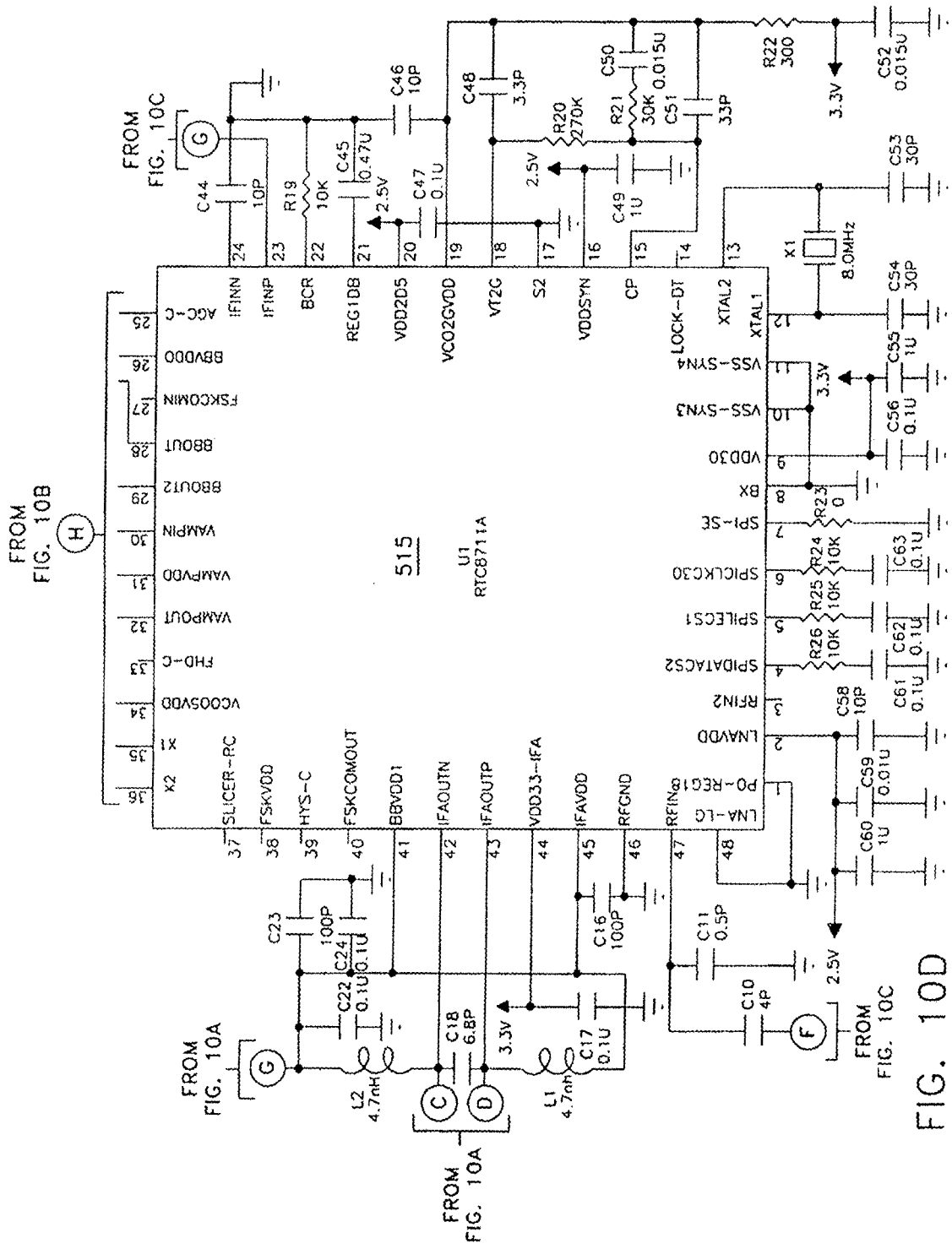

Referring now to FIGS. 8A-8C concurrently, a schematic of the circuit 750 that is used for the image sensor 711 and its associated components is illustrated. As shown in circuit 750, +12 Volt of direct current is applied through a zener diode 751 that provides reverse polarity voltage protection for the camera 130. The capacitors 752-753 act as filters in the circuit 750. A MOSFET transistor 754 and a voltage regulator 755 form a current regulated+5 V DC regulator in the circuit 750. An inductor 756 and capacitors 757-758 filter the output that comes from the regulator formed by MOSFET transistor 754 and regulator 755. Resistors 759-760 establish a voltage reference for the regulator 755.

A sensor circuit 761 and its associated components convert the light passing through the camera lens 114 into electrical impulses and determine the automatic gain control (AGC) levels and the video sync frequency for either PAL or NTSC formats. In the instant invention, PAL is used, however it is to be understood that other acceptable formats may be used. The composite video output of the sensor 761 is then fed to the transmitter 125.

Referring now to FIGS. 9A-9D concurrently, a schematic of the circuit 770 that is used for the transmitter 125 and its associated components is illustrated. An image signal received from the image sensor 711 is shown on the far left side of the circuit 770. The composite image signal passes through a series of filters that are composed of inductors 771, capacitors 773, and resistors 772. These components operate together in order to form a bandpass filter that keeps unwanted frequencies from reaching the transmitter integrated circuit 775.

A voltage regulator 776 and its associated components convert+5 VDC to +3.3 VDC for the integrated transmitter circuit 775. The transmitter circuit 775 is a 2.4 GHz audio/visual transmitter. In the embodiment shown in FIGS. 1, 3a-3d, and 4 only the visual section is used, however it is possible to utilize the audio section should one add a microphone to the camera assembly 100.

The oscillator 718 (FIG. 7A) is used by the transmitter circuit 775 to establish a frequency reference. This frequency is divided by the internal PLL 716 (FIG. 7A) into one of four frequencies: 2.414 GHz, 2.432 GHz, 2.450 GHz, 2.468 GHz. Control of the PLL 716 is determined by grounding combinations of inputs 777 to the transmitter circuit 775.

The 2.4 GHz RF output from the transmitter circuit 775 passes through low pass, and bandpass filters consisting of the inductors 778, the capacitors 779, and a 3 pin Surface Acoustic Wave (SAW) filter 780 to the transmitter antenna 153. The transmitter antenna 153 is discussed in detail above with respect to FIG. 4. As mentioned above, the transmitter antenna 153 may be a simple wire placed inside and/or outside of the camera housing 111 or it can be a ½ wave dipole at the end of the coaxial cable 151 attached to the camera assembly 100 that permits the transmitter antenna 153 to be located inside the vehicle.

Referring now to FIGS. 10A-10D concurrently, a diagram of a circuit 500 for the 2.4 GHz receiver 735 (FIG. 7B) and its associated components is illustrated. The 2.4 GHz RF signal is picked up by the receiver antenna 746, which may be a simple wire that is placed inside the housing 205 of the display device 200. The transistors 511 and their associated components amplify the RF signal and feed it to the receiver circuit 515. The receiver circuit 515 is an integrated circuit. The receiver circuit 515 and its associated components form a complete RF receiver 735 in combination with the crystal oscillator 738, the PLL 740, and the IF amplifier 728, automatic gain control, and video outputs 716. The input pins select one of four frequencies, whichever is the same frequency as that used by the transmitter 125. A voltage regulator 517 regulates+5 V DC to +3.3 V DC. Video output from the receiver circuit 515 is transmitted to the CPU 723 (FIG. 7).

Figure 11:
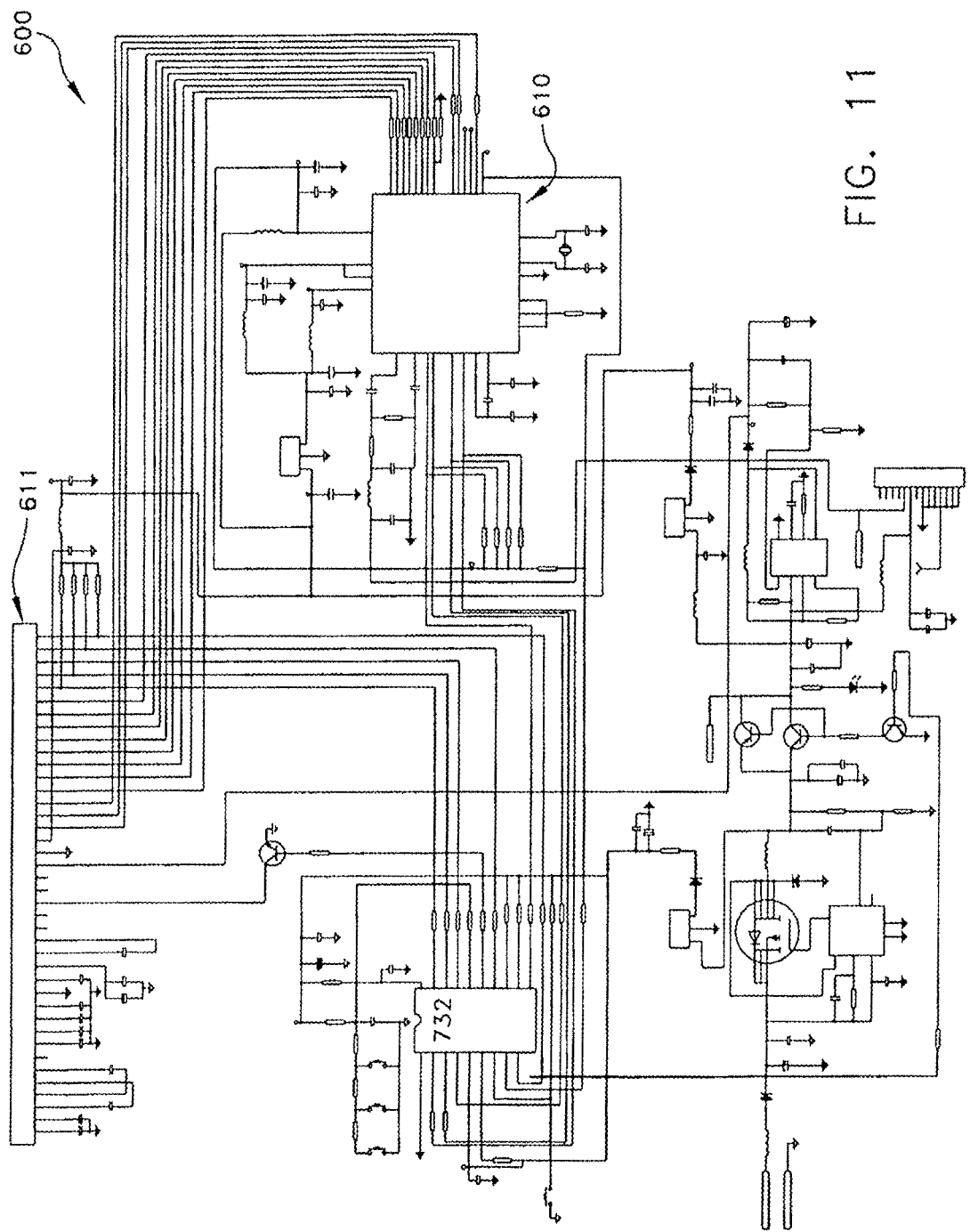
FIG. 11 is an electrical schematic for the CPU, the display, and power supply of the display device of FIG. 1, according to one embodiment of the present invention.

Referring now to FIG. 11, a combined circuit 600 for the CPU 723, the display screen 207, and the power supply circuit 736 is illustrated. For ease of illustration, the values of the electrical components have been omitted. If desired, reference can be made to parent U.S. Non-Provisional application Ser. No. 11/567,504, filed Dec. 6, 2006, now U.S. Pat. No. 7,245,207, for these values. Generally, power for the display device 200 is applied through the same type of circuit that the transmitter 125 uses, plus additional regulators and a DC-to-DC converter provide all the necessary voltages for the CPU 723, the TFT driver IC 732, and the display screen 207. The TFT driver IC 732 is located in the upper left section of the circuit 600. Associated components provide power, brightness, contrast, and image rotate and inversion control functions to the display screen 207. The CPU circuit 610 is located in the upper right section of the circuit 600. It accepts the image signal from the receiver 735 and provides image processing and color balance. The display circuit 611 is located in the top center of the circuit 600. It receives imaging data from the display circuit 611 of the CPU 723, and control signals from the driver circuit 732.

The display circuit 611 turns the electrical impulses back into tiny pixels of light in the correct colors in order to recreate the image perceived by the camera 130.

Referring now to FIGS. 12-17 concurrently, an alternative embodiment of a camera assembly 100A that can be used in conjunction with the backup camera system 1000 of FIG. 1 is illustrated. The camera assembly 100A can replace and/or supplement the camera assembly 100 in the system and/or retrofit kit of the present invention. The camera assembly 100A is similar to the camera assembly 100 discussed above in relation to FIGS. 1-11 in many of its basic structural aspects and functioning. Thus the same reference characters will be used to identify like components of the camera assembly 100A with the addition of alphabetical suffix "A." In order to avoid redundancy, only those aspects of the camera assembly 100A that differ from camera assembly 100 will be discussed in detail below.

The camera assembly 100A is designed so that the camera portion 110A can be pivoted relative to the base portion 120A so that the viewing area of the lens 114A can be adjusted as needed without having to remove the camera assembly 100A from a vehicle once it is mounted. The camera assembly 100A also eliminates the need to use the positioners 40 (FIG. 6).

Figure 12:
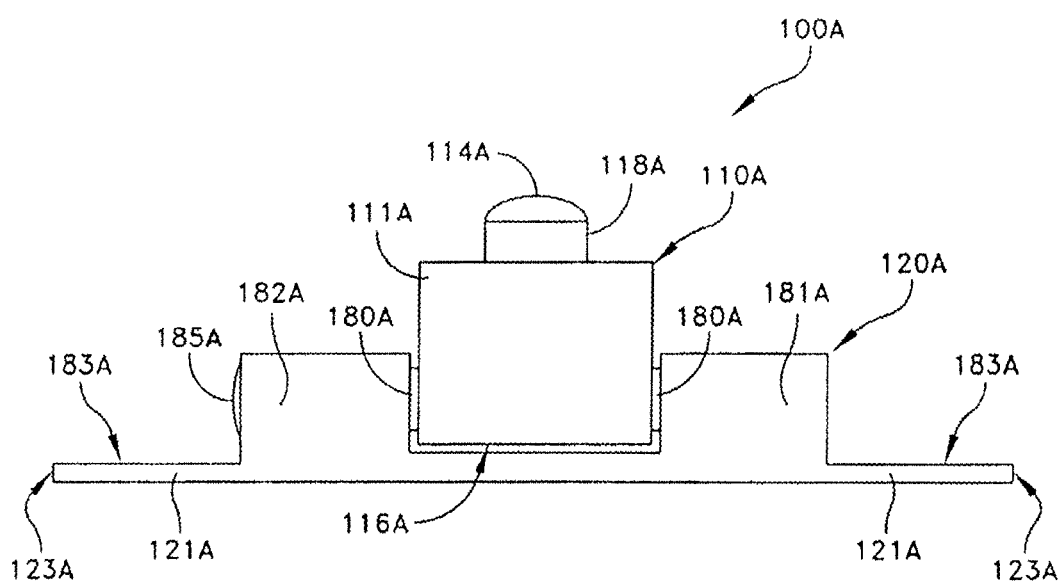
FIG. 12 is a schematic top view of a first alternative embodiment of an adjustable camera assembly that can be used in the backup camera system of FIG. 1, wherein the camera is pivotally connected to the base.
Figure 13:
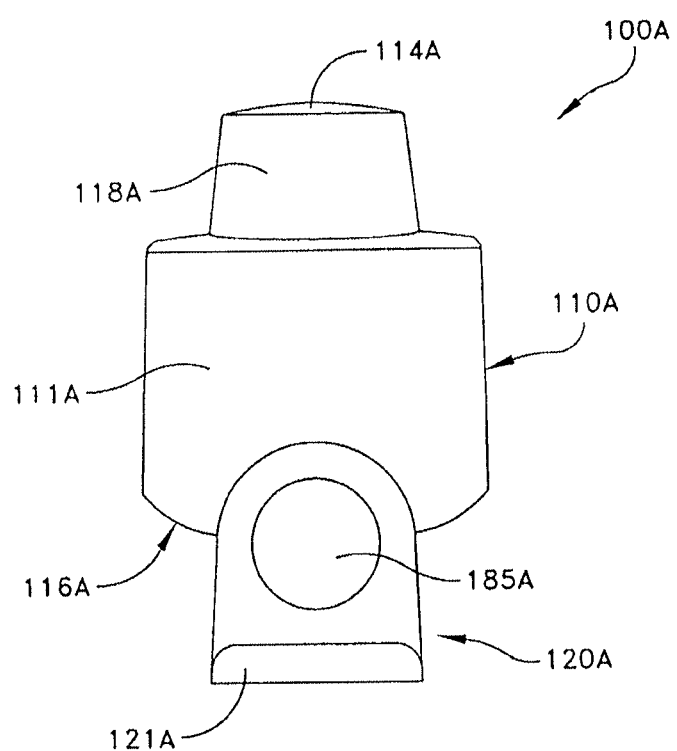
FIG. 13 is a side view of the adjustable camera assembly of FIG. 12.

Referring now to FIGS. 12-13 concurrently, the camera assembly 100A generally comprises the base portion 120A and the camera portion 110A. The housing 111 of the camera portion 110A is pivotally connected to the base portion 120A. In the exemplified embodiment, the housing 111 is pivotally connected to the base portion 120A via a ratchet bar 180A which provides an axis of rotation. The base portion 120A comprises first and second pivot flanges 181A-182A that extend outward from the front surface 183A of the elongated flanges 121A. The pivot flanges 181A-182A are spaced from one another so as to provide a space therebetween in which the camera portion 110A can be positioned.

The pivot flanges 181A-182A are adapted to receive and support the ratchet bar 180A in a manner that allows the ratchet bar 180A to pivot about its axis. In addition to providing a nesting area for the ratchet bar 180A, each of the pivot flanges 181A-182A also forms a housing structure that accommodate one or more of the mechanisms discussed below, such as the rollback bar and gearing. In order to eliminate the base portion 120A from impeding rotation of the camera portion 110A, the outer surface of the rear wall 116A is curved in a convex manner. In another embodiment, only the edges of the rear wall 116A may need to be beveled. In still other embodiments of the invention, if a sufficient clearance is provided between the rear wall 116A of the camera portion 110A and the base portion 120A, the rear wall 116A can be flat. Furthermore, while the pivot flanges 181A-182A are illustrated as housing structures, in other embodiments, the pivot flanges may be simple plate-like or other structures that accommodate the ends of the ratchet bar 180A.

Figure 14:
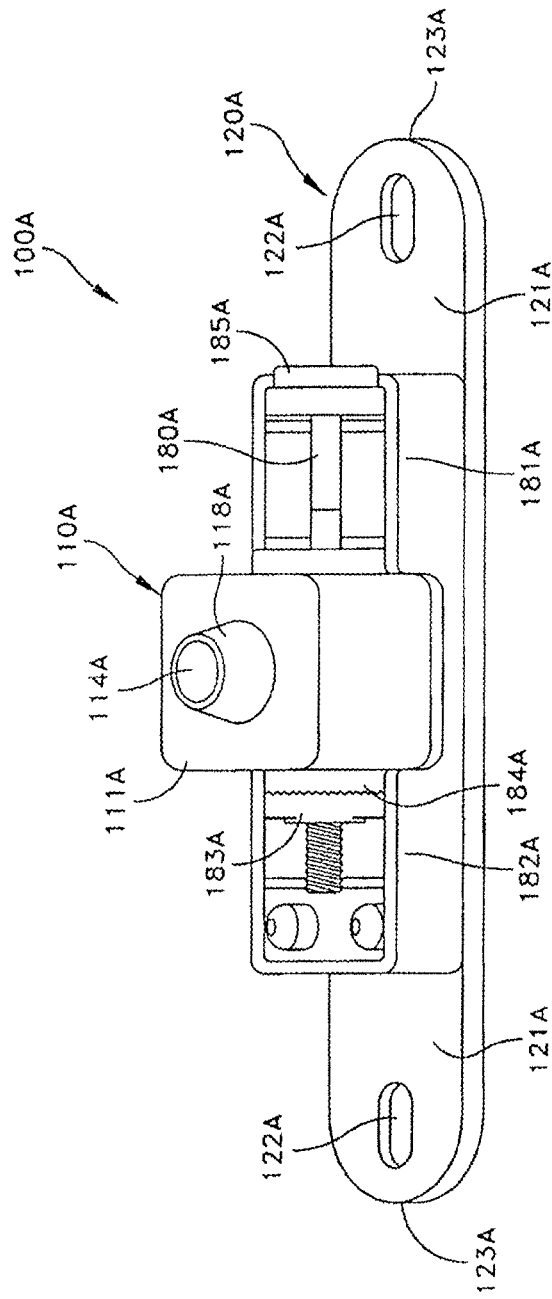
FIG. 14 is a perspective view of the adjustable camera assembly of FIG. 12 wherein a portion of the base's housing is removed so that the interior mechanism for pivoting the camera is visible.
Figure 15:
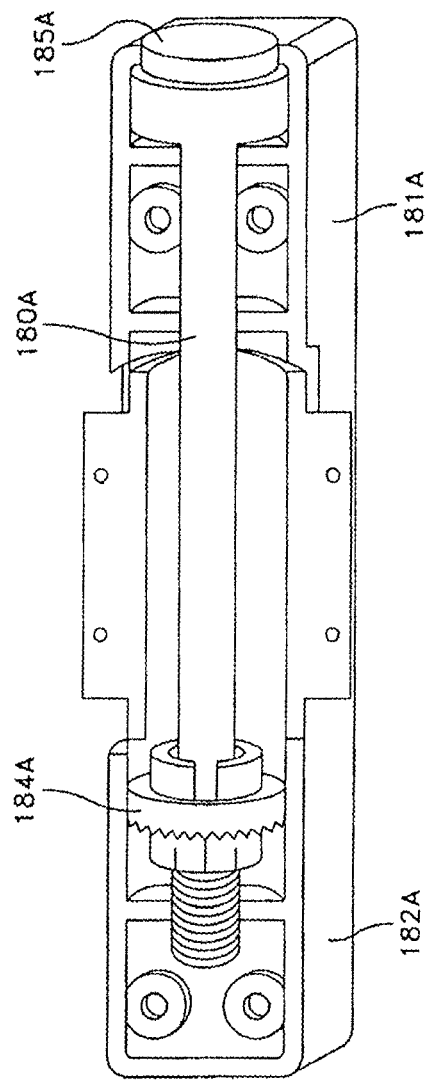
FIG. 15 is a perspective view of the adjustable camera assembly of FIG. 14 wherein the camera has been removed.
Figure 16:
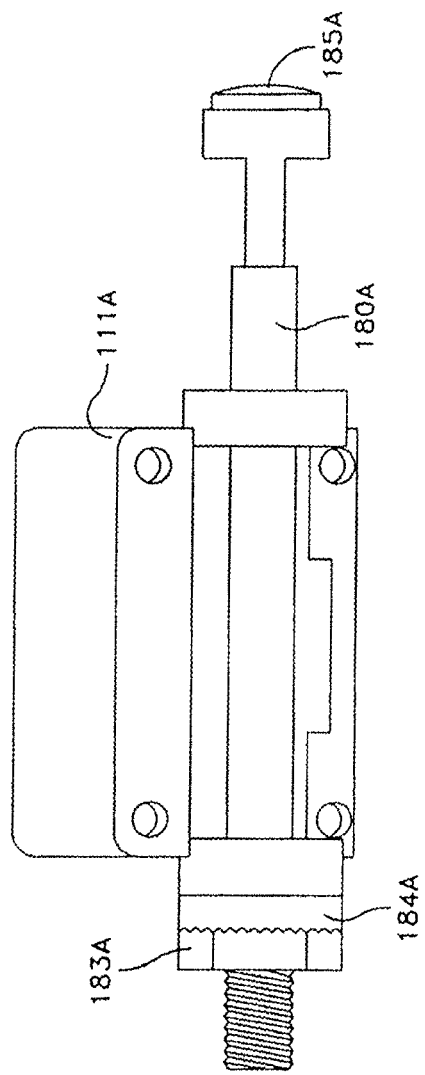
FIG. 16 is a top view of the interior pivoting mechanism of the adjustable camera assembly of FIG. 12 removed from the base.

Referring now to FIGS. 14-16, the internal rotation mechanisms of the camera assembly 100A are illustrated. The internal rotational mechanisms comprise the ratchet bar 180A, an anti-rollback mechanism 183A, and a ratchet member 184A. These components co-operationally work with one another to facilitate the pivoting, locking and unlocking of the camera portion 110A with respect to the base portion 120A.

The ratchet bar 180A extends through holed in the housing 111A of the camera portion 110A, which is rigidly attached thereto. The ratchet bar 180A is positioned within the pivot flanges 181A-182A so as to be capable of being rotated about its axis. Connected near one end of the ratchet bar 180A is the ratchet member 184A. The ratchet member 184A comprises tooth-like protrusions that co-operationally engage with the anti-rollback mechanism 183A. The interaction between the ratchet member 184A and the anti-rollback member 183A permit the ratcheting of the camera portion 110A about the ratchet bar 180A and can lock and unlock the camera portion 110A in a desired pivoting position.

An end cap 185A is connected to the other end of the ratchet bar 180A and is accessible from outside of the pivot flange housings 181A-182A. The end cap 185A is operably coupled to the internal mechanisms so that depressing the end cap 185A releases the anti-rollback mechanism 183A, thereby unlocking the ratchet bar 180A and allowing the user to pivot the camera portion 110A to the desired orientation. When the end cap is not depressed, the anti-rollback mechanism 183A prohibits the ratchet bar 180A from pivoting.

It is to be understood that the aforementioned positioning of the various parts of the ratcheting mechanism may be altered depending on the specifics of the camera assembly and are in no way limiting of the present invention. In simplified embodiments of the camera assembly 100A, internal rotational mechanisms may be absent and the camera portion 110A may be pivotally mounted to the base portion 120A via a simple axle arrangement.

Figure 17:
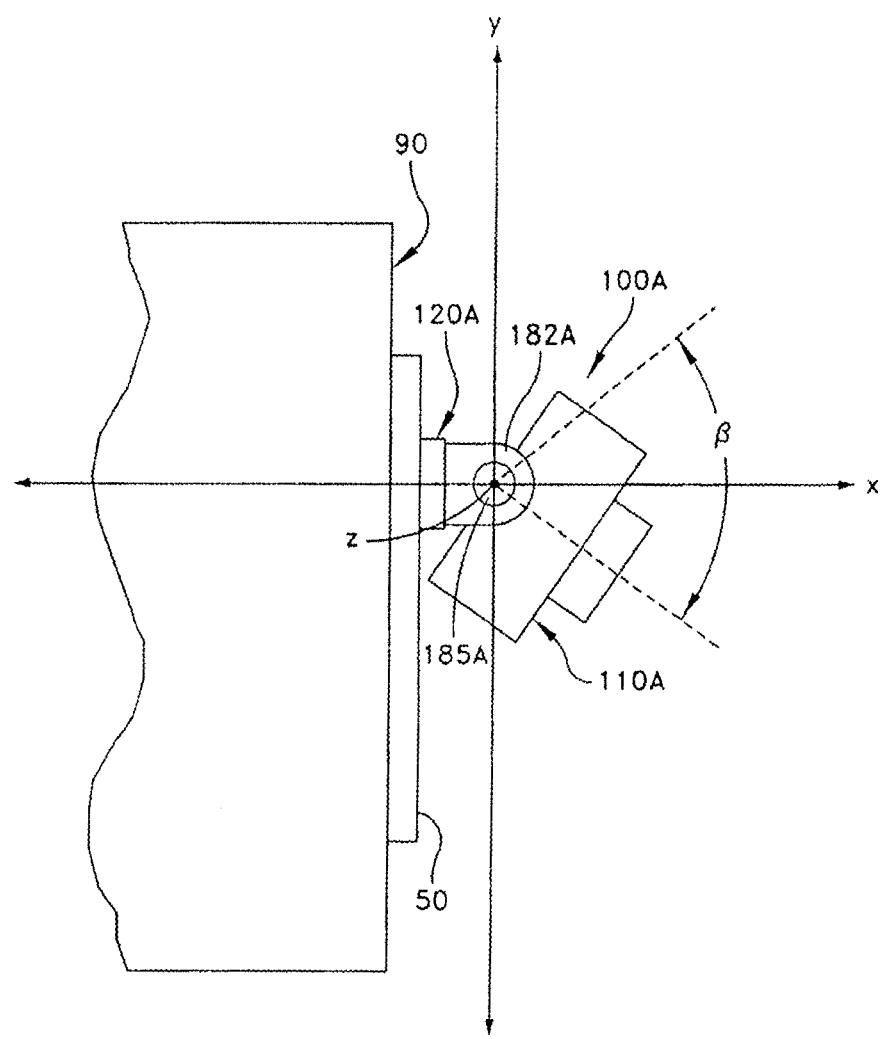
FIG. 17 is a side schematic view of the adjustable camera assembly of FIG. 12 mounted to an exterior surface of a vehicle according one embodiment of the invention.

Referring now to FIG. 17, the rotation of the camera portion 110A of the camera assembly 100A with respect to the base portion 120A when mounted on a rear portion 90 of a vehicle will be discussed. The mounting procedure discussed above with respect to FIG. 6 is generally applicable to the mounting of camera assembly 100A except that the positioners 40 are not used.

The camera assembly 100A is mounted over the license plate 50 using the license plate mounting holes via the elongated flanges 121A. The base portion 120A is rigidly mounted to the rear portion 90 of the vehicle. However, because the camera portion 110A is pivotally mounted to the base potion 120A as described above, the camera portion 110A can rotate about an axis, which in the illustration would be the z-axis (which is visible only as a point Z). As a result, the vertical direction in which the lens 114 is directed can be rotated about the z-axis at an angle $\beta$. This allows the user to orient the camera portion 110A so that its viewing area is directed downward, upward or even with the horizon (which is defined by the plane formed by the x-axis and the z-axis). This adjustment can be achieved without removing the camera assembly 100A from the vehicle once it is mounted. The angle $\beta$ may be between 0 and 180°, however it is preferred that angle $\beta$ be between 0 and 90°.

The axis about which the camera portion 110A can pivot (which is the z-axis in the illustration) is preferably substantially horizontal and runs substantially parallel to a flat surface on which the vehicle is located. While the camera portion 110A can only rotate about the z-axis in the exemplified embodiment, the invention is not so limited. In other embodiments, the camera portion 110A may be pivotally mounted to the base portion 120A so as to be able to rotate in a variety of directions with increased degrees of freedom. For example, a ball joint can be used as the pivot connection.

Furthermore, in embodiments of the backup camera system 1000 where an adjustable camera assembly (such as camera assembly 100A) is used, the rotation/pivoting of the camera portion may be controlled by the operator within the vehicle without having to manually pivot the camera portion. This can be achieved by including servo-motors in the camera assembly 100A that are operable from within the vehicle. In such an embodiment, it may be possible to adapt the view adjust button 212 of the display device 200 to control the servo-motors.

Figure 18:
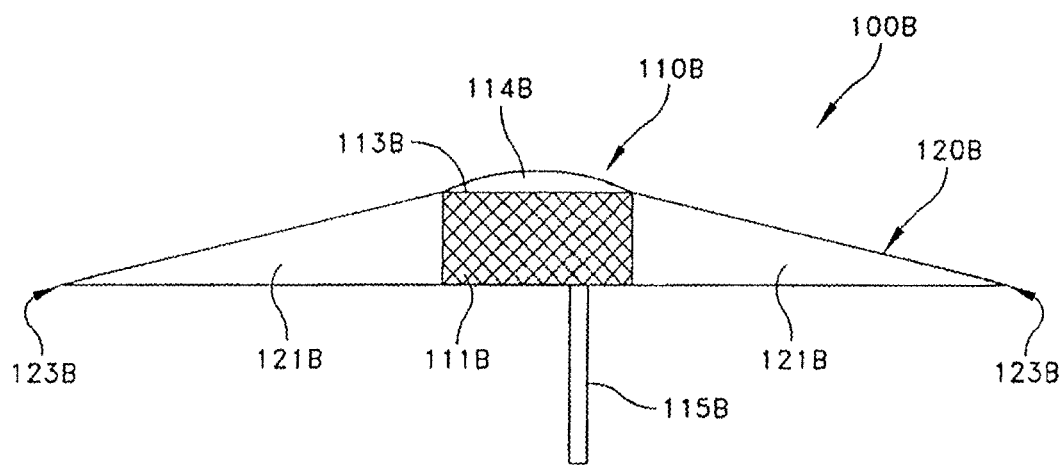
FIG. 18 is a top view of a second alternative embodiment of an adjustable camera assembly that can be used in the backup camera system of FIG. 1, wherein the camera is pivotally connected to the base.
Figure 19:
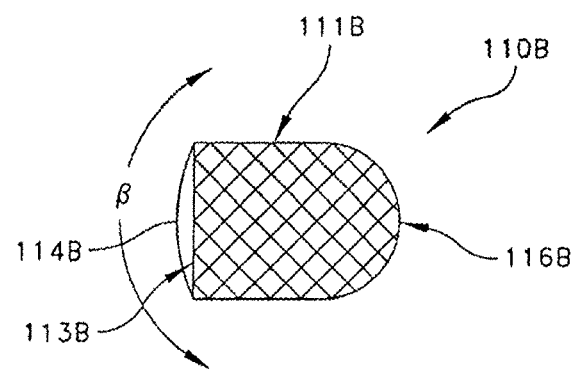
FIG. 19 schematically illustrates how the camera of the adjustable camera assembly if FIG. 19 can be pivoted.

Referring now to FIGS. 18-19, a second alternative embodiment of an adjustable camera assembly 100B is illustrated. The camera assembly 100B can replace and/or supplement the camera assemblies 100, 100A in the system and/or retrofit kit of the present invention. The camera assembly 100B is similar to the camera assemblies 100, 100A discussed above in relation in many of its basic structural aspects and functioning. Thus the same reference characters will be used to identify like components of the camera assembly 100B with the addition of alphabetical suffix "B." In order to avoid redundancy, only those aspects of the camera assembly 100B that differ from camera assemblies 100, 100A will be discussed in detail below.

As with the camera assembly 100A, the camera assembly 100B is designed so that the camera portion 110B can be pivoted relative to the base portion 120B so that the viewing area of the lens 114B can be adjusted as needed without having to remove the camera assembly 100B from a vehicle once it is mounted.

In camera assembly 100B, the housing 111B of the camera portion 110B is pivotally mounted to the base portion 120B so that the front wall 113B of the housing 34 is substantially flush with a front surface of the elongated flanges 121B. The rear wall 116B of the housing 111B has a rounded surface that permits the housing 111B in an unimpeded manner despite the existence of a very minimal clearance.

An internal rotational mechanism, such as that discussed above with respect to camera assembly 100A, is used. However, as opposed to having some of the components of the internal rotational mechanism placed within the housing formed by the pivot flanges, the components of the internal rotational mechanism are placed within cavities formed within the elongated flanges 121B themselves. Thus, the elongated flanges 121B act as the pivot flanges in this embodiment. The placement of the internal rotational mechanism within the elongated flanges 38 and within the housing 111B permits the camera assembly 100B to have a low profile.

Figure 21:
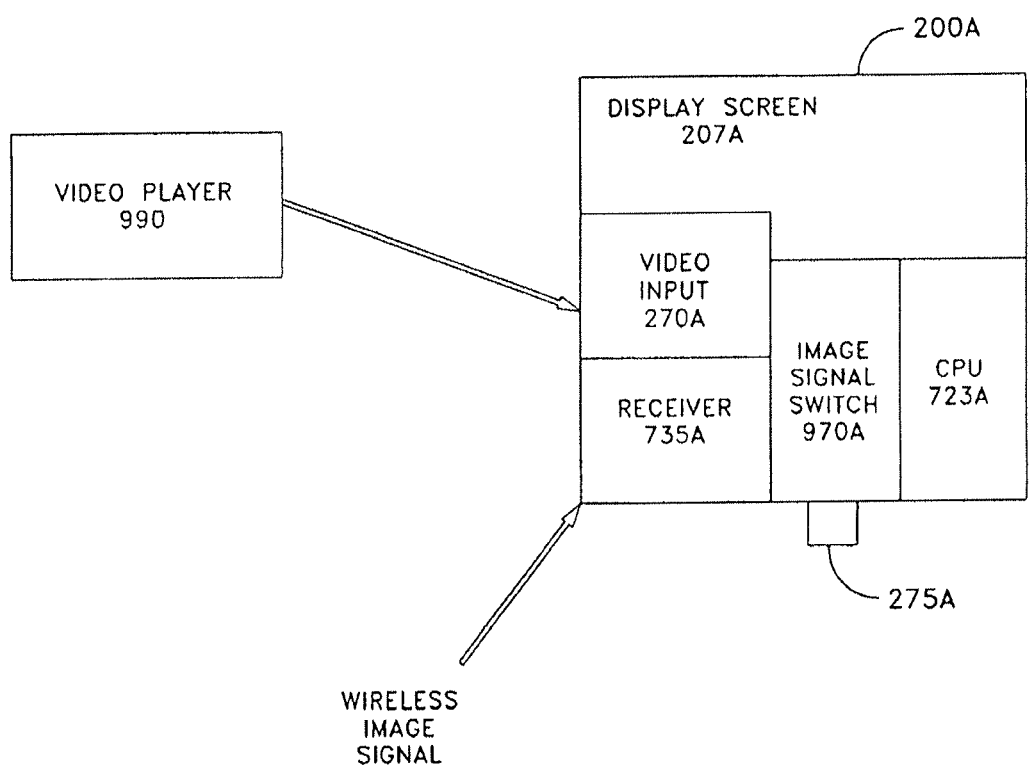
FIG. 21 is a high-level operational schematic of a backup camera system utilizing the multi-input display device of FIG. 20 in conjunction with a video player, according to another embodiment of the present invention.

Referring now to FIGS. 21, an alternative embodiment of a multi-input display device 200A that can be used in conjunction with the backup camera system 1000 of FIG. 1 is illustrated. The display device 200A can replace and/or supplement the display device 200 in the system and/or retrofit kit of the present invention. The display device 200A is similar to the display device 200 discussed above in relation to FIGS. 1-11 in many of its basic structural aspects, functioning and interaction with the other components of the backup camera system 1000. Thus the same reference characters will be used to identify like components of the display device 200A with the addition of alphabetical suffix "A." In order to avoid redundancy, only those aspects of the display device 200A that differ from the display device 200 will be discussed in detail below.

The display device 200A comprises a video input port 270A and a manual switch 275A provided on the front surface of the display housing 205A. The video input port 270A and the manual switch 275A are operably connected to the internal circuitry of the display device 200A, as will be described later in relation to FIG. 21. The video input port 270A is adapted to accommodate a first plug end of a video cable that is operably connected to an external video player 990 (FIG. 21) at the other end. The video input port 270A can receive video signals from the external video player 990 for reproduction on the display screen 207A. If desired, the video input port 270A can also be adapted to operate as means for charging the external video player 990. The video input port 270A can be any type of port that can be used to operably couple an external device, including without limitation a USB port, a standard jack port, a firewire port, an AN port, a second RF receiver, etc.

The manual switch 275A is operably connected to a switching circuit 970A (FIG. 21) that controls whether the image signal displayed on the display screen 207A is based on the signal received from via the video input port 270A or the receiver 735A (FIG. 21). Stated another way, the switching circuit 970A is used to select between designating the video input port 270A or the receiver 735A as the image signal source for visual display on the display device 200A. Of course, additional video sources can be incorporated into the display device 200A. In the exemplified embodiment, the switch 275A is a physical switch. However, the switch 275A can be an electronic switch such as a touch button on a the display screen 207A, a voice recognition circuit, a touch wheel, a button, etc. Furthermore, in other embodiments of the display device 200A, the switching circuit 970A itself may be adapted to automatically select and/or switch the signal source upon detection of an event, thereby eliminating the need for a physical switch 275A.

Referring now to FIG. 21, a high level circuit schematic of the display device 200A is illustrated. In utilizing the multi-input display device 200A, a video player 990 is operably coupled to the video input port 275A via a video cable. The video player 990 may be any type of video player, portable or installed in the vehicle, such as a DVD player or a video iPod®. It is intended that the video player 990 may be capable of reproducing and transmitting any type of video format such as MPEG-4, AVI, WMV-9, and DRM. It is further anticipated that additional formats may be employed as well.

As with the display device 200 discussed earlier, the multi-input display device 200A has a receiver circuit 725 that is capable of receiving a wireless signal transmitted from a second image signal source, such as the camera assembly 100. Both the video input port 275A and the receiver circuit 735A are operably coupled to the image signal switch 970A. The image signal switch circuit 970A is operably connected to and controlled by the manual switch 275A.

The image signal switch 170 is operably coupled to the CPU 723A which performs the necessary image processing required to provide the image signals to the display screen 207A for visual display. The image signal switch circuit 970A selects whether the visual display in the display screen 207A is based on the image signal received from the video input port 275A. Stated another way, depending on the position of the switch 275A, the image signal switch circuit 970A selects either the image signal from the video input port 275A or the image signal from the receiver 735A to transmit to the display screen 207A.

While the image signal switch circuit 970A is exemplified as being controlled by the manual switch 275A, the image signal switch 970A may be designed to perform an automatic switching/selection upon the occurrence and/or detection of a certain event. For example, the image signal switch 970A can automatically select transmission of the image signal from the video input port 275A to the display screen 207A upon a jack being inserted into the video input port 275A or upon detecting an incoming video signal from the video input port 275A. If desired, the receiver 735A can be deactivated when not selected as the signal source.

Utilizing this automatic switching arrangement for safety reasons, the image signal switch 970A can be operated by the CPU 723A so as to automatically switch/select transmission of the image signal received from the camera assembly 100 when the corresponding image signal is received at the receiver 735A. This can occur, for example, when the camera assembly 100 and transmitter 125 are activated, such as when the vehicle is placed in reverse.

Figure 22:
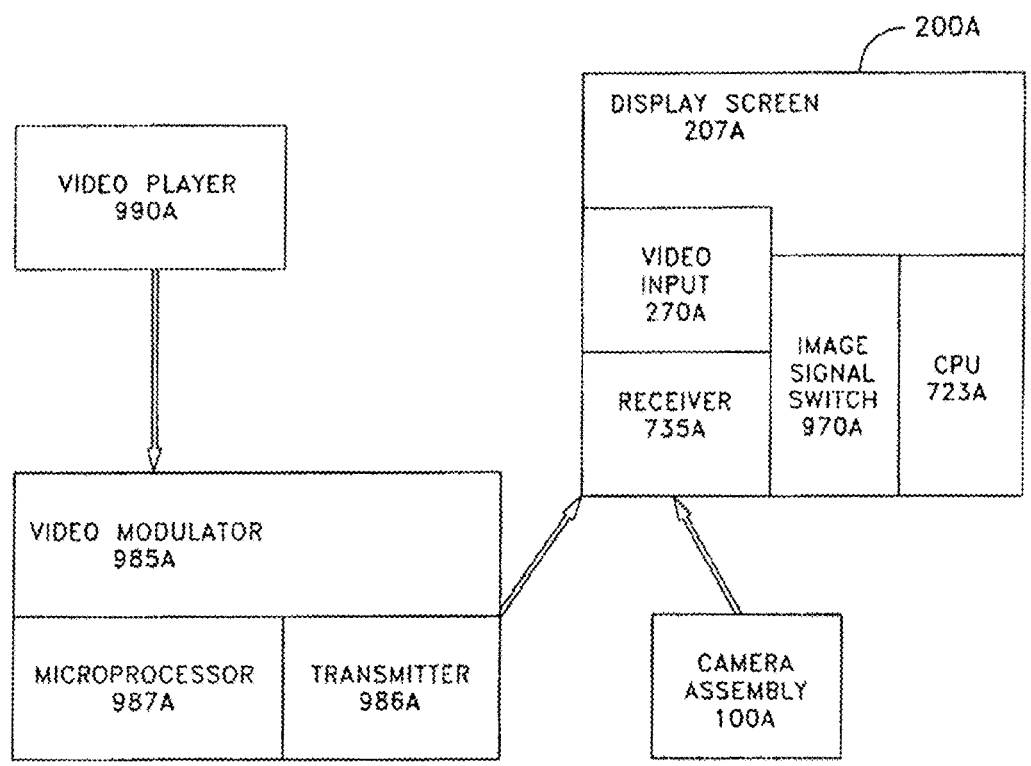
FIG. 22 is a high-level operational schematic of a backup camera system utilizing the multi-input display device of FIG. 20 in conjunction with a video player connected to a modulator, according to another embodiment of the present invention.

Referring now to FIG. 22, an embodiment of the display device 200A wherein its image signal switch 970A (and corresponding circuitry) is adapted to select between processing one of a plurality of wireless signals for transmission to the display device 207A is illustrated.

In some embodiments, the image signal from the video player 990A will be wireless, such as when the video player 990A is connected directly to a video modulator 985A. Alternatively, the video player 990A may contain an internal transmitter that enables direct transmission of video signals to the display device 200A.

Still referring to FIG. 22, the video player 990A transmits the video signal to the video modulator 985A via a video cable. In other embodiments, the video signal may be transmitted through a USB port, or other compatible port such as a IEEE 1394 port (i.e. a firewire port). The video modulator 985A may also act as an inverter and operate to recharge the video player 990A and/or supply power to it. The video modulator 985A may be plugged into a vehicle's 12 V socket and/or operate on batteries.

The video modulator 985A has a microprocessor 987A that processes the image signals that are received from the video player 990A. The microprocessor 987A processes the incoming image signals so that they can be transmitted to the display device 200A. After the video modulator 985A processes the image signals, they are transmitted to the modulator transmitter 986A, where they are converted into wireless signals that are transmitted to the display device 200A at a predetermined frequency which the receiver 735A of the display device 200A is enabled to receive.

In the event that a video player 990A is wirelessly transmitting its images through the video modulator 985A, the image signal switch 970A can be adapted to detect the frequency of the incoming wireless signal received by the receiver 735A. By detecting the frequency of the incoming image signal, the image signal switch 970A can give priority (i.e., select for transmission) the image signal having a desired/pre-selected frequency. For example, the image signal switch 970A can give priority to an incoming wireless image signal transmitted at the frequency at which the transmitter of the camera 100 transmits. Alternatively, the image signal from the camera 100 may contain data that instructs the CPU 723A to activate the switch 970A.

Figure 23:
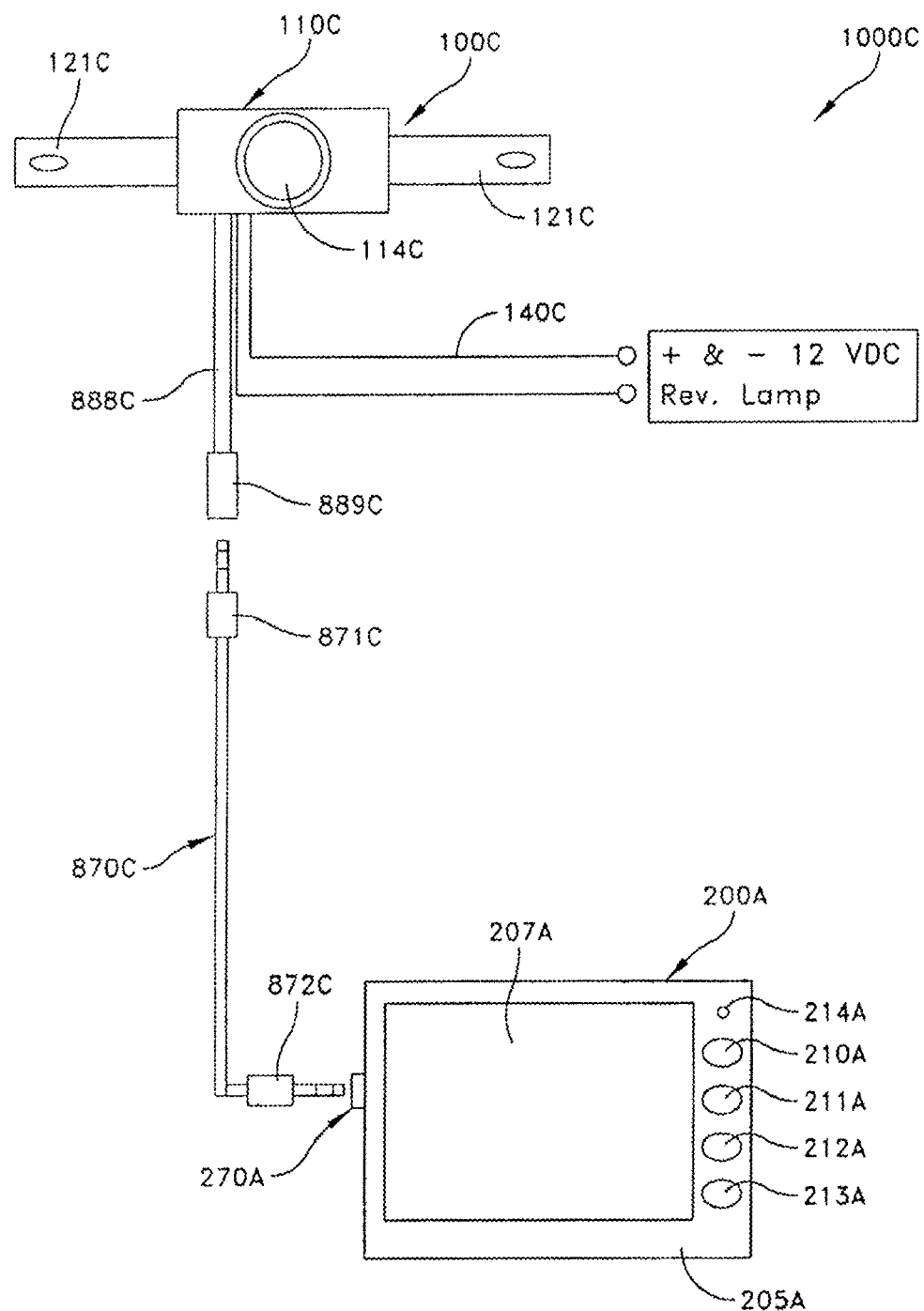
FIG. 23 is a schematic of a combined wired-wireless backup camera system according to one embodiment of the present invention.
Figure 24:
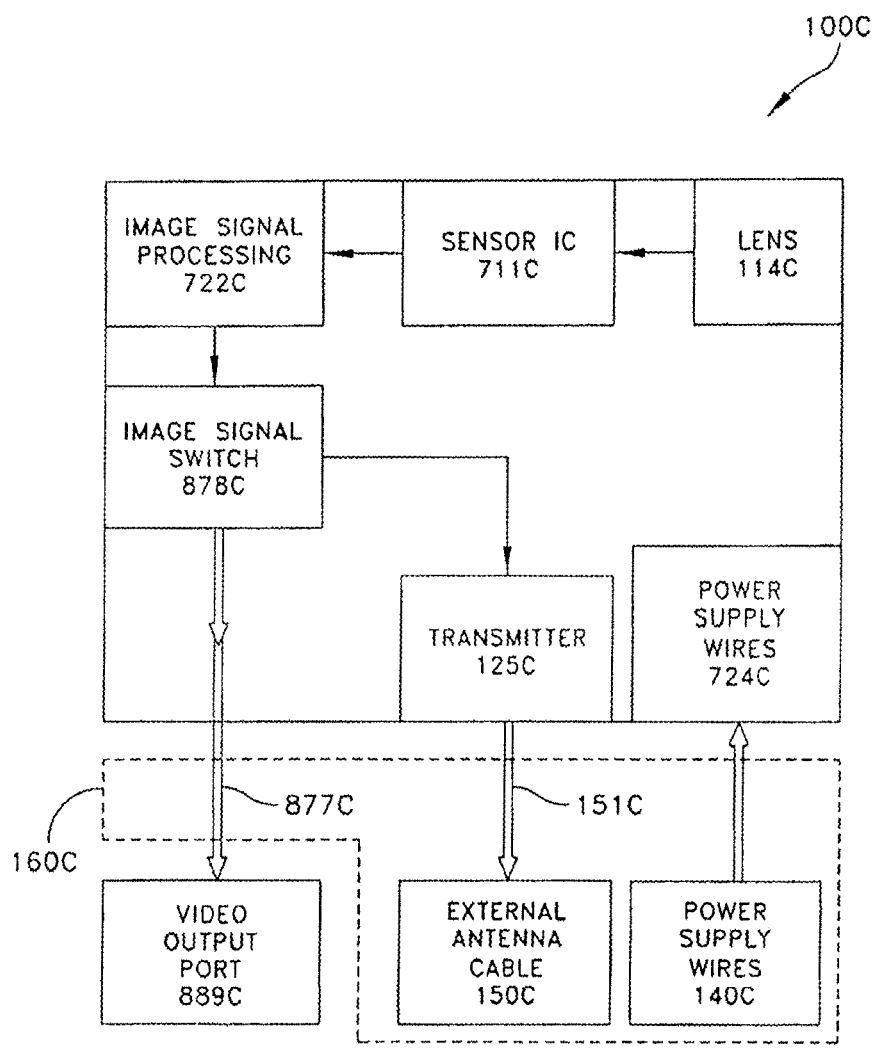
FIG. 24 is a high-level operational schematic of combined wired-wireless camera assembly according to one embodiment of the present invention.

Referring now to FIGS. 23-24 concurrently, an alternative embodiment of a backup camera system 1000C is illustrated. The backup camera system 1000C comprises a camera assembly 100C, a display device 200A, and a video cable 870C. The backup camera system 1000C, and its components, are similar to the backup camera system 1000, and the components, discussed above in many aspects. However, the backup camera system 1000C is designed to facilitate both wired and wireless image signal transmission from the camera component 100C to the display device 200A. The display device 200A is described above with respect to FIGS. 20-22. The video cable 870C can be any type of cable capable of transmitting video signals, including without limitation a coaxial cable, a DSL cable, a phone cable, a USB cable, an A/V cable, etc. The ends of the video cable 870C are adapted for operable insertion into and cooperation with the video out put port 889C of the camera assembly 100C and the video input port 270A of the display device 200A. As such, the ends 871C-872C of the video cable 870C can be any type of adapter components, such as a USB jack, an A/V jack, a phone jack, a banana plug, etc.

The camera assembly 100C is specifically designed to utilize the multi-input capabilities of the display device 200A so that a user can choose whether the camera assembly 100C is to transmit the image signal to the display device 100C wirelessly or through a hard-wire connection. When sold as a retrofit kit, the backup camera system 1000C is especially useful in that a single kit can be used to afford viewing capabilities to a wide range of vehicles.

Extending from the rear of the camera assembly 100C are power supply wires 140C and a combined wire assembly 888C. The combined wire assembly 888C comprises an external antenna cable 115C identical to the one described above with respect to the FIG. 4. The combined wire assembly 888C also comprises a video signal wire 877C that is operably coupled to the internal circuitry of the camera assembly 100C at one end and has the video output port 889C at the other end. The video output port 889C can be any type of port, including a USB port, a phone jack, a standard A/V port, etc. In the exemplified embodiment, the video out put port 889C is a 3.5 mm, 4 pole jack that is located within the interior of the vehicle when the camera assembly 100C is mounted top the vehicle. If desired the power supply wires 140C can be incorporated into the same heat shrink tubing 160C which surrounds the external antenna cable 150C and the video signal wire 877C, as is schematically shown in FIG. 24 and described with respect to FIG. 4 above.

The display device 200A functions as discussed above in FIGS. 21-22, including the functions associated with the switching circuit 970A. The internal circuitry of the camera assembly 100C is designed to perform a similar switching function with respect to transmission of the image signal.

The camera assembly 100C comprises an image signal switch circuit 878C operably coupled to the image signal processor 722C, the transmitter 125C and the video output port 877C. The image signal switching circuit 878C receives the image signal (which corresponds to the perceived image) from the image signal processor 722C. The image signal switching circuit 878C selects whether the image signal will be transmitted to the transmitter 125C for wireless transmission to the display device 200A or to the video output port 889C for hard-wired transmission to the display device 200A. As with the switching circuit of the display device 200A discussed above, the selection by the image signal switching circuit 878C can be dictated by a manual switch or can be automated.

In a manual switch embodiment, depending on the position of the switch, the image signal switching circuit 878C either transmits the image signal to the video output port 889C or to the transmitter 125C. In an automated embodiment, the selection of the image signal switching circuit 878C is dictated by the occurrence and/or detection of a certain event. For example, the image signal switching circuit 878C can automatically select transmission of the image signal to the video output port 889C upon the plug 871C of the video cable 870C being inserted into the video output port 889C. If desired, the transmitter 125C can be deactivated when not selected as the transmission source.

When the video cable 870C is inserted into both the display device 200A and the video output port 889C, the camera assembly 100C may then send both power and the video signal to the display device 200A.

It is to be understood, however, that even though numerous characteristics and advantages of the present invention have been set forth in the foregoing description, together with details of the structure and function of the invention, the disclosure is illustrative only, and changes may be made in detail, especially in matters of shape, size and arrangement of parts within the principles of the invention to the full extent indicated by the broad general meaning of the terms in which the appended claims are expressed. Any of the components of the backup camera system, and respective functional capabilities, can be mixed and matched as desired to create the most desirable backup camera system and/or retrofit kit.

What is claimed is:

1. A system for monitoring an area around a vehicle comprising:
   a camera assembly comprising a camera portion and a base portion, wherein the camera portion comprises a camera, wherein the base portion comprises elongated flanges that extend in opposite directions from the camera, and wherein a hole is formed in each flange for attaching the camera assembly to the vehicle by passing screws, bolts or other connectors through the holes in the flanges and into license plate mounting holes on the vehicle;
   a transmitter operably coupled to the camera for wirelessly transmitting an image signal from the camera, the image signal corresponding to a perceived image by the camera;
   a display device comprising a power supply, a receiver for receiving the wirelessly transmitted image signal, and an image processing unit operably coupled to the receiver for converting the received image signal into a display image that is displayed on the display device, the display image corresponding to the perceived image; and
   a support structure adapted to support the display device.

2. A system according to claim 1 wherein the display device is configured to receive and display video input from a video source other than the camera.

3. A system according to claim 2 wherein the display comprises a video input port for connection of the display to said video source other than the camera.

4. A device according to claim 2 further comprising a switch that controls whether the image signal displayed on the display screen is based on the signal received from the camera or a signal received from said video source other than the camera.

5. A system according to claim 1 wherein the camera assembly further comprises an internal power supply.

6. A system according to claim 5 wherein the camera assembly internal power supply comprises a battery.

7. A system according to claim 1 wherein the viewing angle of the camera is adjustable from a location within a passenger compartment of the vehicle.

8. A retrofit kit comprising a system according to claim 1 in combination with components useable for installation of the system on a vehicle.

9. A retrofit kit according to claim 8 wherein the display device is configured to receive and display video input from a source other than the transmitter.

10. A retrofit kit according to claim 9 wherein the display has a video input port for connection of the display to said source other than the transmitter.

11. A retrofit kit according to claim 9 further comprising a switch that controls whether the image signal displayed on the display screen is based on the signal received from the camera or a signal received from said video source other than the camera.

* * * * *